United States Patent
Kitamura et al.

(10) Patent No.: US 11,364,767 B2
(45) Date of Patent: Jun. 21, 2022

(54) VEHICLE-MOUNTED TEMPERATURE CONTROLLER

(71) Applicant: Toyota Jidosha Kabushiki Kaisha, Toyota (JP)

(72) Inventors: Manabu Kitamura, Miyoshi (JP); Hidefumi Aikawa, Shizuoka-ken (JP); Yuji Miyoshi, Susono (JP); Masaki Suzuki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 16/837,505

(22) Filed: Apr. 1, 2020

(65) Prior Publication Data
US 2020/0317026 A1    Oct. 8, 2020

(30) Foreign Application Priority Data

Apr. 3, 2019 (JP) .............................. JP2019-071540

(51) Int. Cl.
*B60H 1/00* (2006.01)
*B60H 1/04* (2006.01)
(Continued)

(52) U.S. Cl.
CPC ..... *B60H 1/00778* (2013.01); *B60H 1/00885* (2013.01); *B60H 1/04* (2013.01);
(Continued)

(58) Field of Classification Search
CPC ............ B60H 1/00778; B60H 1/00885; B60H 1/3227; B60H 1/03; B60H 1/00278;
(Continued)

(56) References Cited

U.S. PATENT DOCUMENTS 5,910,157 A * 6/1999 Noda ................. B60H 1/00914
62/133
5,910,159 A * 6/1999 Matsuo ..................... F25B 5/02
62/158

(Continued)

FOREIGN PATENT DOCUMENTS

JP    2009-180103 A    8/2009
JP    2015-186989 A    10/2015

*Primary Examiner* — Ljiljana V. Ciric
(74) *Attorney, Agent, or Firm* — Dinsmore & Shohl LLP

(57) ABSTRACT

A vehicle-mounted temperature controller, including: a first heat circuit having a heater core used for heating and a first heat exchanger and configured so that a first heat medium is circulated through the first heat exchanger; a refrigeration circuit having the first heat exchanger condensing the refrigerant and an evaporator evaporating the refrigerant, and configured to operate a refrigeration cycle; and a heat medium flow path of an internal combustion engine configured to communicate with the first heat circuit so that the first heat medium circulates through the heat medium flow path. The first heat circuit is configured so that an outlet of the heat medium flow path is communicated with a core downstream side part positioned downstream of the heater core and upstream of the first heat exchanger and a core upstream side part positioned downstream of the first heat exchanger and upstream of the heater core.

12 Claims, 12 Drawing Sheets

(51) Int. Cl.
  *B60H 1/32*  (2006.01)
  *B60H 1/03*  (2006.01)

(52) U.S. Cl.
  CPC ..... *B60H 1/32284* (2019.05); *B60H 1/00764* (2013.01); *B60H 1/03* (2013.01); *B60H 1/3227* (2013.01); *B60H 2001/00307* (2013.01)

(58) Field of Classification Search
  CPC ...... B60H 1/32284; B60H 2001/00928; B60H 2001/00307; B60H 1/00899; B60H 1/04; B60H 1/00342
  See application file for complete search history.

(56) References Cited

U.S. PATENT DOCUMENTS

| | | | |
|---|---|---|---|
| 6,189,604 B1 * | 2/2001 | Yamauchi | B60H 1/00328 165/140 |
| 6,742,352 B2 * | 6/2004 | Kampf | F28D 1/035 62/430 |
| 6,854,286 B2 * | 2/2005 | Bureau | B60H 1/323 62/244 |
| 10,391,834 B2 * | 8/2019 | Enomoto | B60H 1/00278 |
| 10,577,984 B2 * | 3/2020 | Aumann | F01K 13/02 |
| 10,906,376 B2 * | 2/2021 | Enomoto | F01P 9/06 |
| 11,207,941 B2 * | 12/2021 | Lee | B60H 1/00342 |
| 2011/0016896 A1 * | 1/2011 | Oomura | B60H 1/00921 62/155 |
| 2013/0081419 A1 * | 4/2013 | Katoh | B60H 1/004 62/278 |
| 2013/0240185 A1 * | 9/2013 | Katoh | F28D 1/0476 165/140 |
| 2015/0059401 A1 * | 3/2015 | Matsuda | F28D 7/16 62/498 |
| 2015/0075204 A1 * | 3/2015 | Brodie | B60H 1/00335 62/324.6 |
| 2016/0169586 A1 * | 6/2016 | Ito | F28D 1/05391 165/104.21 |
| 2016/0238322 A1 * | 8/2016 | Inoue | F28F 9/027 |
| 2017/0021698 A1 | 1/2017 | Hatakeyama et al. | |
| 2017/0370332 A1 * | 12/2017 | Kondrk | F02M 31/205 |
| 2018/0264913 A1 * | 9/2018 | Enomoto | F01P 7/161 |
| 2018/0272839 A1 * | 9/2018 | Kato | B60H 1/08 |
| 2018/0297445 A1 * | 10/2018 | Onishi | B60H 1/00921 |
| 2018/0354344 A1 * | 12/2018 | Miura | B60H 1/321 |
| 2019/0137152 A1 * | 5/2019 | Akiyoshi | F28D 1/05391 |
| 2020/0224891 A1 * | 7/2020 | Ito | F24F 1/022 |
| 2021/0379960 A1 * | 12/2021 | Kim | B60H 1/00921 |
| 2021/0379962 A1 * | 12/2021 | Kim | B60H 1/22 |
| 2021/0387505 A1 * | 12/2021 | Kim | B60H 1/3227 |
| 2021/0387506 A1 * | 12/2021 | Miyoshi | B60H 1/32284 |

* cited by examiner

VEHICLE-MOUNTED TEMPERATURE CONTROLLER

CROSS-REFERENCE TO RELATED APPLICATIONS

This application claims priority to Japanese Patent Application No. 2019-071540 filed Apr. 3, 2019, which is incorporated herein by reference in its entirety including the specification, drawings, and abstract.

FIELD

The present disclosure relates to a vehicle-mounted temperature controller.

BACKGROUND

In the past, a vehicle-mounted temperature controller provided with a refrigeration circuit and a high temperature circuit has been proposed (for example, PTL 1). The refrigeration circuit is configured so as to operate a refrigeration cycle by circulation of a refrigerant. The high temperature circuit has a heater core used for heating the inside of a passenger compartment. In this vehicle-mounted temperature controller, the refrigeration circuit and the high temperature circuit share a single heat exchanger. This heat exchanger transfers heat from the refrigerant to cooling water of the high temperature circuit to make the refrigerant of the refrigeration circuit condense.

Further, in the vehicle-mounted temperature controller according to PTL 1, the high temperature circuit is communicated with a cooling water flow path of an internal combustion engine. Therefore, the high temperature circuit is configured so that the cooling water raised in temperature by absorbing heat from the internal combustion engine and the cooling water raised in temperature by absorbing heat from the refrigerant at the heat exchanger can flow into the heater core. Further, when the inside of the passenger compartment should be heated, during operation of the internal combustion engine, the cooling water raised in temperature at the internal combustion engine is supplied to the heater core, while when the internal combustion engine is stopped, the cooling water raised in temperature at the heat exchanger is supplied to the heater core.

CITATIONS LIST

Patent Literature

[PTL 1] Japanese Unexamined Patent Publication No. 2009-180103

SUMMARY

Technical Problem

In this regard, in the vehicle-mounted temperature controller described in PTL 1, when the cooling water raised in temperature at the internal combustion engine is supplied to the heater core for heating, cooling water does not circulate through the circuit between the heat exchanger and the heater core. Therefore, at this time, the temperature of the cooling water in the circuit between the heat exchanger and the heater core becomes lower.

After that, if the internal combustion engine is stopped, the source of supply of cooling water to the heater core is switched from the internal combustion engine to the heat exchanger. However, at this time, the temperature of the cooling water in the circuit between the heat exchanger and the heater core is low, therefore right after the source of supply of the cooling water to the heater core is switched, low temperature cooling water flows to the heater core temporarily. As a result, inside the passenger compartment, despite heating being demanded, the heating function is stopped temporarily after the internal combustion engine is stopped and cold air is supplied into the passenger compartment.

On the other hand, when supplying cooling water raised in temperature at an internal combustion engine to a heater core for heating so as to keep such a situation from occurring as well, it may also be considered to circulate warm cooling water to the heat exchanger. However, in this case, warm cooling water flows to the high temperature circuit side of the heat exchanger, therefore even if operating the refrigeration cycle in the refrigeration circuit, it is not possible to make the refrigerant sufficiently discharge heat at the heat exchanger. Therefore, it is not possible to efficiently operate the refrigeration cycle at the refrigeration circuit.

In view of the above problem, an object of the present disclosure is to provide a vehicle-mounted temperature controller able to keep a heating function from temporarily stopping during heating while effectively operating a refrigeration cycle in the refrigeration circuit when necessary.

Solution to Problem

The present disclosure was made so as to solve the above problem and has as its gist the following.

(1) A vehicle-mounted temperature controller, comprising:
  a first heat circuit having a heater core used for heating an inside of a passenger compartment and a first heat exchanger and configured so that a first heat medium is circulated therethrough,
  a refrigeration circuit having the first heat exchanger discharging heat from a refrigerant to the first heat medium to make the refrigerant condense and an evaporator making the refrigerant absorb heat to make the refrigerant evaporate, and configured to operate a refrigeration cycle by the refrigerant being circulated therethrough, and
  a heat medium flow path of an internal combustion engine configured to communicate with the first heat circuit so that the first heat medium circulates therethrough, wherein
  the first heat circuit is configured so that an outlet of the heat medium flow path is communicated with a core downstream side part of the first heat circuit positioned downstream of the heater core and upstream of the first heat exchanger in a direction of circulation of the first heat medium and a core upstream side part of the first heat circuit positioned downstream of the first heat exchanger and upstream of the heater core in the direction of circulation of the first heat medium, and further comprises a first circulation mode control device able to switch between at least two states of a first state where the outlet of the heat medium flow path is communicated with the core upstream side part and a second state where the outlet of the heat medium flow path is communicated with the core downstream side part.

(2) The vehicle-mounted temperature controller according to above (1), wherein the first circulation mode control device is controlled based on a presence of a demand for heating the inside of the passenger compartment, a presence of operation of the internal combustion engine, and a presence of a circulation of refrigerant in the refrigeration circuit.

(3) The vehicle-mounted temperature controller according to above (1) or (2),
  further comprising a temperature sensor detecting a temperature of the first heat medium flowing into the first heat exchanger,
  wherein the first circulation mode control device is controlled based on a temperature of the first heat medium detected by the temperature sensor.

(4) The vehicle-mounted temperature controller according to above (3), wherein if the first heat medium in the first heat circuit is circulating through the heat medium flow path of the internal combustion engine, the first circulation mode control device is set to the first state when the temperature of the first heat medium detected by the temperature sensor is equal to or greater than a reference temperature, and is set to the second state when the temperature of the first heat medium detected by the temperature sensor is less than the reference temperature.

(5) The vehicle-mounted temperature controller according to any one of above (1) to (4), wherein if the first heat medium in the first heat circuit is circulating through the heat medium flow path of the internal combustion engine, the first circulation mode control device is set to the second state when the refrigerant is not circulating in the refrigeration circuit.

(6) The vehicle-mounted temperature controller according to any one of above (1) to (5), wherein the first heat circuit further comprises a radiator provided in parallel with the heater core with respect to the first heat exchanger and a second circulation mode control device controlling a circulation mode of the first heat medium from the first heat exchanger to the heater core and the radiator.

(7) The vehicle-mounted temperature controller according to above (6), wherein the second circulation mode control device is controlled so that when the first circulation mode control device is set to the first state, an amount of circulation of cooling water from the first heat exchanger to the heater core becomes smaller than an amount of circulation of cooling water from the first heat exchanger to the radiator.

(8) The vehicle-mounted temperature controller according to any one of above (1) to (7), wherein the first heat circuit is configured so that an inlet of the heat medium flow path of the internal combustion engine is communicated with the core downstream side part.

(9) The vehicle-mounted temperature controller according to any one of above (1) to (8), wherein
  the temperature controller further comprises a second heat circuit provided with a heat generating device heat exchanger exchanging heat with heat generating device and configured so that a second heat medium is circulated through the heat generating device, and
  the evaporator is part of a second heat exchanger exchanging heat between the second heat medium and the refrigerant so that heat is transferred from the second heat medium to the refrigerant.

According to the present disclosure, it is possible to provide a vehicle-mounted temperature controller able to keep a heating function from temporarily stopping during heating while effectively operating a refrigeration cycle in the refrigeration circuit when necessary.

DESCRIPTION OF EMBODIMENTS

Figure 1:
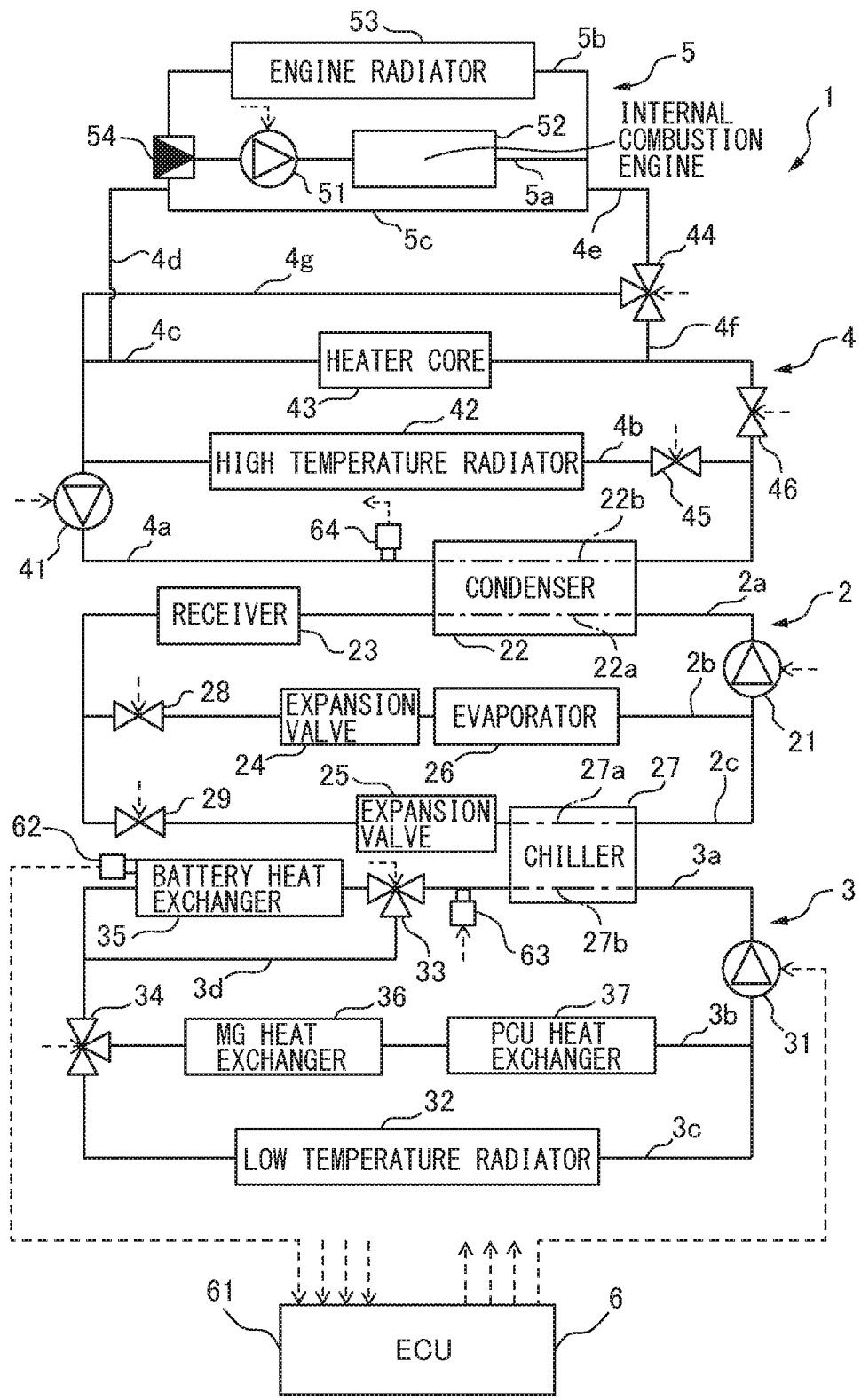
FIG. 1 is a view of the configuration schematically showing a vehicle-mounted temperature controller.

Below, referring to the drawings, embodiments will be explained in detail. Note that, in the following explanation, similar components are assigned the same reference signs.

Configuration of Vehicle-Mounted Temperature Controller

Figure 2:
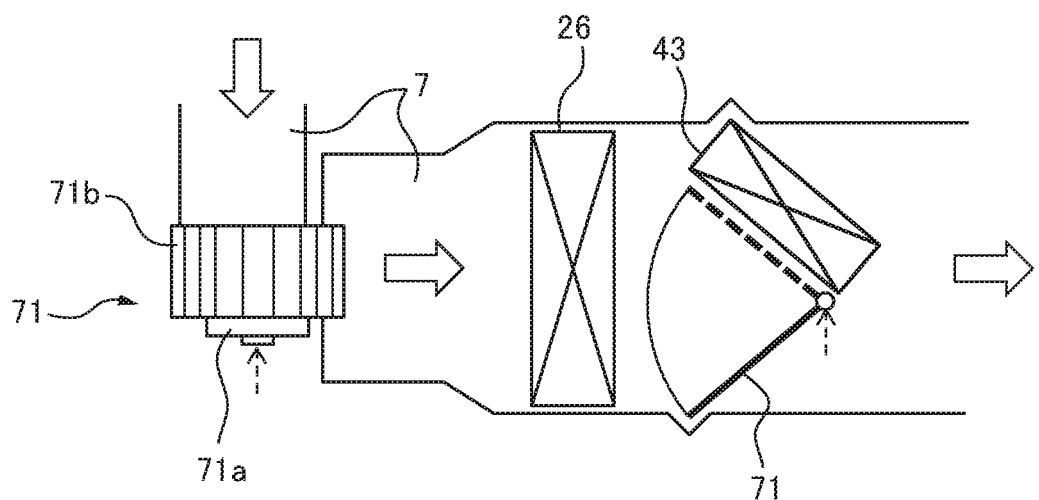
FIG. 2 is a view of the configuration schematically showing an air passage for air-conditioning a vehicle mounting the vehicle-mounted temperature controller.
Figure 3:
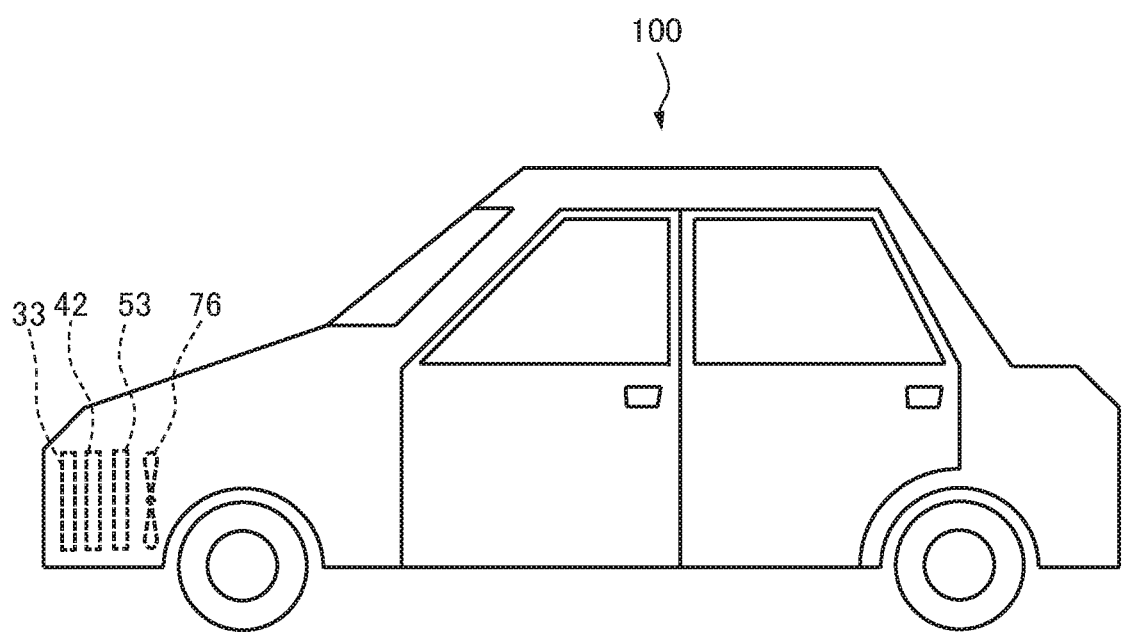
FIG. 3 is a view schematically showing the vehicle mounting the vehicle-mounted temperature controller.

Referring to FIGS. 1 to 3, the configuration of a vehicle-mounted temperature controller 1 according to a first embodiment will be explained. FIG. 1 is a view of the configuration schematically showing the vehicle-mounted temperature controller 1. In the present embodiment, the vehicle-mounted temperature controller 1 is particularly mounted in a hybrid vehicle driven by a motor and internal combustion engine.

The vehicle-mounted temperature controller 1 includes a refrigeration circuit 2, low temperature circuit (second heat circuit) 3, high temperature circuit (first heat circuit) 4, engine cooling circuit 5, and control device 6.

First, the refrigeration circuit 2 will be explained. The refrigeration circuit 2 includes a compressor 21, refrigerant piping 22a of a condenser 22, receiver 23, first expansion valve 24, second expansion valve 25, evaporator 26, refrigerant piping 27a of the chiller 27, first solenoid regulating valve 28, and second solenoid regulating valve 29. The refrigeration circuit 2 is configured to operate a refrigeration cycle by circulation of a refrigerant through these components. For the refrigerant, for example, a hydrofluorocarbon (for example, HFC-134a) or any other substance generally used as a refrigerant in the refrigeration cycle is used.

The refrigeration circuit 2 is divided into a refrigerant basic flow path 2a, evaporator flow path 2b, and chiller flow path 2c. The evaporator flow path 2b and the chiller flow path 2c are provided parallel to each other and are respectively connected to the refrigerant basic flow path 2a.

At the refrigerant basic flow path 2a, the compressor 21, the refrigerant piping 22a of the condenser 22, and the receiver 23 are provided in that order in a direction of circulation of the refrigerant. At the evaporator flow path 2b, the first solenoid regulating valve 28, the first expansion valve 24, and the refrigerant piping 27a of the evaporator 26 are provided in that order in a direction of circulation of the refrigerant. In addition, at the chiller flow path 2c, the second solenoid regulating valve 29, the second expansion valve 25, and the chiller 27 are provided in that order.

At the refrigerant basic flow path 2a, the refrigerant flows regardless of the opening/closing of the first solenoid regulating valve 28 and the second solenoid regulating valve 29. If the refrigerant flows to the refrigerant basic flow path 2a, the refrigerant flows through the compressor 21, the refrigerant piping 22a of the condenser 22, and the receiver 23 in that order. At the evaporator flow path 2b, the refrigerant flows when the first solenoid regulating valve 28 is opened. If the refrigerant flows to the evaporator flow path 2b, the refrigerant flows through the first solenoid regulating valve 28, the first expansion valve 24, and the refrigerant piping 27a of the evaporator 26 in that order. The refrigerant flows to the chiller flow path 2c when the second solenoid regulating valve 29 is opened. If the refrigerant flows to the chiller flow path 2c, the refrigerant flows through the second solenoid regulating valve 29, the second expansion valve 25, and the chiller 27 in that orders.

The compressor 21 functions as a compressor compressing the refrigerant to raise it in temperature. In the present embodiment, the compressor 21 is an electrically driven type, and is configured so that the discharge capacity can be changed steplessly by adjustment of the electric power supplied to the compressor 21. In the compressor 21, the mainly gaseous refrigerant with low temperature and low pressure flowing out from the evaporator 26 or the chiller 27 is adiabatically compressed, whereby it is changed to a mainly gaseous refrigerant with high temperature and high pressure.

The condenser 22 is provided with the refrigerant piping 22a and cooling water piping 22b. The condenser 22 functions as a first heat exchanger for discharging heat from the refrigerant to something other than the refrigerant and cooling water of the later explained low temperature circuit 3 to cause the refrigerant to condense. In the present embodiment, the condenser 22 exchanges heat between the refrigerant flowing through the refrigerant piping 22a and the cooling water flowing through the later explained cooling water piping 22b and transfers the heat from the refrigerant to this cooling water. The refrigerant piping 22a of the condenser 22 functions as a condenser condensing the refrigerant in the refrigeration cycle. Further, in the refrigerant piping 22a of the condenser 22, the mainly gaseous refrigerant with high temperature and high pressure, flowing out from the compressor 21, is changed to mainly liquid refrigerant with high temperature and high pressure by being isobarically cooled.

The receiver 23 stores the refrigerant condensed by the refrigerant piping 22a of the condenser 22. Further, in the condenser 22, not necessarily all of the refrigerant can be liquefied, therefore the receiver 23 is configured to separate the gas and liquid. Only liquid refrigerant, from which the gaseous refrigerant is separated, flows out from the receiver 23. Note that, instead of the receiver 23, the refrigeration circuit 2 may also use a sub cool type condenser housing a gas-liquid separator as the condenser 22.

The first expansion valve 24 and the second expansion valve 25 functions as a expander for making the refrigerant expand. These expansion valves 24 and 25 are provided with small diameter passages, and spray refrigerant from the small diameter passages to make the pressure of the refrigerant rapidly decrease. The first expansion valve 24 sprays a mist of liquid refrigerant supplied from the receiver 23 into the evaporator 26. Similarly, the second expansion valve 25 sprays a mist of liquid refrigerant supplied from the receiver 23 into the refrigerant piping 27a of the chiller 27. At these expansion valves 24 and 25, the liquid refrigerant with high temperature and high pressure, flowing out from the receiver 23, is depressurized and partially vaporizes, whereby it is changed to a mist-like refrigerant with low temperature and low pressure. Note that, the expansion valves may be mechanical type expansion valves with fixed superheating degrees or may be electrical type expansion valves able to adjust the superheating degrees. Further, if possible to make the refrigerant expand to reduce the pressure, for example, ejectors or other devices may be used as the expander, instead of the first expansion valve 24 and the second expansion valve 25.

The evaporator 26 functions as an evaporator causing the refrigerant to evaporate. Specifically, the evaporator 26 makes the refrigerant absorb heat from the air surrounding the evaporator 26 to make the refrigerant evaporate. Therefore, in the evaporator 26, the mist-like refrigerant with low temperature and low pressure, flowing out from the first expansion valve 24 is changed to a gaseous refrigerant with low temperature and low pressure, by evaporation. As a result, the air surrounding the evaporator 26 can be cooled and the passenger compartment can be cooled.

The chiller 27 is provided with the refrigerant piping 27a and the cooling water piping 27b. The chiller 27 functions as a second heat exchanger for making the refrigerant absorb heat from the cooling water of the later explained low temperature circuit 3 to evaporate the refrigerant. In the present embodiment, the chiller 27 exchanges heat between the cooling water flowing through the later explained cooling water piping 27b and the refrigerant flowing through the refrigerant piping 27a, and transfers heat from this cooling water to the refrigerant. The refrigerant piping 27a of the chiller 27 functions as an evaporator for making the refrigerant evaporate. Further, at the refrigerant piping 27a of the chiller 27, the mist-like refrigerant with low temperature and low pressure, flowing out from the second expansion valve 25, evaporates, whereby it is changed to a gaseous refrigerant with low temperature and low pressure. As a result, the cooling water of the low temperature circuit 3 is cooled.

The first solenoid regulating valve 28 and the second solenoid regulating valve 29 are used for changing the circulation mode of refrigerant in the refrigeration circuit 2. The larger the opening degree of the first solenoid regulating valve 28, the greater the amount of the refrigerant flowing into the evaporator flow path 2b. Accordingly, the amount of refrigerant flowing into the evaporator 26 becomes greater. Further, the larger the opening degree of the second solenoid regulating valve 29, the greater the amount of refrigerant flowing into the chiller flow path 2c and accordingly the greater the amount of refrigerant flowing into the chiller 27. Note that, in the present embodiment, the solenoid regulating valve 28 is configured as a valve able to be adjusted in opening degree, but it may also be an on-off valve switched between an opened state and a closed state. Further, instead of the first solenoid regulating valve 28 and the second solenoid regulating valve 29, it is also possible to provide a three-way valve able to make the refrigerant from the refrigerant basic flow path 2a selectively flow into only the evaporator flow path 2b, only the chiller flow path 2c, and/or both. Therefore, if possible to adjust the flow rate from the refrigerant basic flow path 2a to the evaporator flow path 2b and the chiller flow path 2c, some sort of valve may also be provided instead of these solenoid regulating valves 28 and 29.

Next, the low temperature circuit 3 will be explained. The low temperature circuit 3 includes a first pump 31, the cooling water piping 27b of the chiller 27, a low temperature radiator 32, first three-way valve 33, and second three-way valve 34. In addition, the low temperature circuit 3 includes the battery heat exchanger 35, MG heat exchanger 36, and PCU heat exchanger 37. In the low temperature circuit 3, the cooling water circulates through these components Note that, the cooling water is one example of the second heat medium. Inside the low temperature circuit 3, any other heat medium may be used instead of the cooling water.

The low temperature circuit 3 is divided into a low temperature basic flow path 3a, low temperature radiator flow path 3b, and heat generating device flow path 3c. The low temperature radiator flow path 3b and the heat generating device flow path 3c are provided parallel to each other and are respectively connected to the low temperature basic flow path 3a.

The low temperature basic flow path 3a is provided with, in a direction of circulation of cooling water, the first pump 31, the cooling water piping 27b of the chiller 27, and the battery heat exchanger 35 in that order. Further, at the low temperature basic flow path 3a, a bypass flow path 3d is connected so as to bypass the battery heat exchanger 35. In the present embodiment, the bypass flow path 3d is connected at one end between the chiller 27 and battery heat exchanger 35 in the direction of circulation of cooling water and is connected at the other end to the downstream side of the battery heat exchanger 35 in the above direction. At the connection part of the low temperature basic flow path 3a and the bypass flow path 3d, a first three-way valve is provided.

Further, the low temperature radiator flow path 3b is provided with the low temperature radiator 32. At the heat generating device flow path 3c, the MG heat exchanger 36 and PCU heat exchanger 37 are provided in that order in the direction of circulation of cooling water. The heat generating device flow path 3c may also be provided with a heat exchanger exchanging heat with heat generating device other than the MG or PCU. Between the low temperature basic flow path 3a and low temperature radiator flow path 3b and the heat generating device flow path 3c, a second three-way valve 34 is provided.

The first pump 31 pumps the cooling water circulating through the low temperature circuit 3. In the present embodiment, the first pump 31 is electrically driven water pumps, and is configured so as to be able to be changed in discharge capacities steplessly by adjustment of the electric power supplied to the first pump 31.

The low temperature radiator 32 is a heat exchanger exchanging heat with the cooling water circulating through the low temperature circuit 3 and the air outside of the vehicle 100 (outside air). The low temperature radiator 32 is configured to discharge heat from the cooling water to the outside air when the temperature of the cooling water is higher than the temperature of the outside air and to absorb heat from the outside air to the cooling water when the temperature of the cooling water is lower than the temperature of the outside air.

The first three-way valve 33 is configured so that the cooling water flowing out from the cooling water piping 27b of the chiller 27 flows selectively into the battery heat exchanger 35 or the bypass flow path 3d. In the low temperature basic flow path 3a, when the first three-way valve 33 is set at the battery heat exchanger 35 side, the cooling water flows through the first pump 31, the cooling water piping 27b of the chiller 27, and the battery heat exchanger 35 in that order of the components. On the other hand, when the first three-way valve 33 is set to the bypass flow path 3d side, the cooling water does not circulate through the battery heat exchanger 35, therefore flows through only the first pump 31 and the chiller 27.

The second three-way valve 34 is configured so that the refrigerant flowing out from the low temperature basic flow path 3a selectively flows between the low temperature radiator flow path 3b and the heat generating device flow path 3c. If the second three-way valve 34 is set to the low temperature radiator flow path 3b side, the cooling water flowing out from the low temperature basic flow path 3a flows through the low temperature radiator 32. On the other hand, if the second three-way valve 34 is set to the heat generating device flow path 3c side, the cooling water flowing out from the low temperature basic flow path 3a flows through these MG heat exchanger 36 and PCU heat exchanger 37 in the order of these components. In addition, if able to set the second three-way valve 34 so that the cooling water flows to both, part of the cooling water flowing out from the low temperature basic flow path 3a flows through the low temperature radiator 32, while the remainder flows through the MG heat exchanger 36 and PCU heat exchanger 37 in the order of these components.

Note that, if possible to suitably adjust the flow rate of the cooling water flowing to the battery heat exchanger 35 and bypass flow path 3d, an adjusting valve or on-off valve or other adjusting device may be used, instead of the first three-way valve 33. Similarly, if possible to suitably adjust the flow rate of the cooling water flowing into the low temperature radiator flow path 3b and heat generating device flow path 3c, an adjusting valve or on-off valve or other adjusting device may be used, instead of the second three-way valve 34.

The battery heat exchanger 35 is configured so as to exchange heat with the battery (not shown) of the vehicle 100. Specifically, the battery heat exchanger 35, for example, is provided with piping provided around the battery, and is configured so that heat is exchanged between the cooling water flowing through this piping and the battery.

The MG heat exchanger 36 is configured to exchange heat with the motor-generator (MG, not shown) of the vehicle 100. Specifically, the MG heat exchanger 36 is configured so as to exchange heat between oil and cooling water flowing around the MG. Further, the PCU heat exchanger 37 is configured to exchange heat with the power control unit (PCU, not shown) of the vehicle 100. Specifically, the PCU heat exchanger 37 is provided with piping provided around the PCU and is configured so that heat is exchanged between the cooling water flowing through this piping and the battery.

Next, the high temperature circuit 4 will be explained. The high temperature circuit 4 is provided with a second pump 41, cooling water piping 22b of the condenser 22, high temperature radiator 42, heater core 43, third three-way valve 44, third solenoid regulating valve 45, and fourth solenoid regulating valve 46. In the high temperature circuit 4 as well, the cooling water is circulated through these components. Note that, this cooling water is one example of the first heat medium. In the high temperature circuit 4, any other heat medium may be used instead of cooling water.

Further, the high temperature circuit 4 is divided into a high temperature basic flow path 4a, high temperature radiator flow path 4b, heater flow path 4c, engine inflow flow path 4d, engine outflow flow path 4e, core upstream side communication path 4f, and core downstream side communication path 4g. The high temperature radiator flow path 4b and heater flow path 4c are provided in parallel with each other and are respectively connected to the high temperature basic flow path 4a. Note that, in this Description, the part of the high temperature circuit 4 positioned downstream of the condenser 22 and upstream of the heater core 43 in the direction of circulation of the cooling water (part of high temperature basic flow path 4a and heater flow path 4c) will be called the "core upstream side part". Further, the part of the high temperature circuit 4 positioned downstream of the heater core 43 and upstream of the condenser 22 in the direction of circulation of the cooling water (remaining part of high temperature basic flow path 4a and heater flow path 4c) will be called the "core downstream side part".

The engine inflow flow path 4d is communicated with the heater flow path 4c at the downstream side of the heater core 43 in the direction of circulation of the cooling water and the engine cooling circuit 5. In particular, the engine inflow flow path 4d is communicated with the engine cooling circuit 5 at the inlet side of the cooling water flow path of the internal combustion engine 52 in the direction of circulation of the cooling water of the engine cooling circuit 5. As a result, the high temperature circuit 4 is configured so that the inlet of the cooling water flow path of the internal combustion engine 52 provided at the engine cooling circuit 5 is communicated with the core downstream side part by the engine inflow flow path 4d.

The engine outflow flow path 4e communicates with the engine cooling circuit 5 at one end part and communicates with the core upstream side communication path 4f and core downstream side communication path 4g at the other end part. In particular, the engine outflow flow path 4e communicates with the engine cooling circuit 5 at the outlet side of the cooling water flow path of the internal combustion engine 52 in the direction of circulation of the cooling water in the engine cooling circuit 5. Further, the core upstream side communication path 4f communicates with the heater flow path 4c at the upstream side of the heater core 43 in the direction of circulation of the cooling water. On the other hand, the core downstream side communication path 4g communicates with the heater flow path 4c at the downstream side of the heater core 43 in the direction of circulation of the cooling water. As a result, the high temperature circuit 4 is configured so that the outlet of the cooling water flow path of the internal combustion engine 52 separately communicates with the core upstream side part and core downstream side part.

The high temperature basic flow path 4a is provided with a second pump 41 and cooling water piping 22b of the condenser 22 in that order in the direction of circulation of the cooling water. The high temperature radiator flow path 4b is provided with a third solenoid regulating valve 45 and high temperature radiator 42 in that order in the direction of circulation of the cooling water. Further, the heater flow path 4c is provided with a fourth solenoid regulating valve 46 and heater core 43 in that order in the direction of circulation of the cooling water. Note that, the heater flow path 4c may also be provided with an electric heater at the upstream side of the heater core 43 in the direction of circulation of the cooling water. The third three-way valve 44 is provided between the engine outflow flow path 4e and the core upstream side communication path 4f and core downstream side communication path 4g.

The second pump 41 pumps the cooling water circulating through the high temperature circuit 4. In the present embodiment, the second pump 41 is an electrically powered water pump in the same way as the first pump 31. Further, the high temperature radiator 42, in the same way as the low temperature radiator 32, is a heat exchanger exchanging heat between the cooling water circulating through the high temperature circuit 4 and the outside air.

The heater core 43 is configured to exchange heat between the cooling water circulating through the high temperature circuit 4 and the air around the heater core 43 to warm the air around the heater core 43, and as a result heat the inside of the passenger compartment. Specifically, the heater core 43 is configured to discharge the heat from the cooling water to the air around the heater core 43. Therefore, if high temperature cooling water flows to the heater core 43, the temperature of the cooling water decreases and the air around the heater core 43 is warmed.

The third three-way valve 44 functions as a first circulation mode control device able to switch between a first state in which the engine outflow flow path 4e communicates with the core upstream side communication path 4f and a second state in which the engine outflow flow path 4e communicates with the core downstream side communication path 4g. If the third three-way valve 44 is set to the first state, the cooling water flowing out from the cooling water flow path of the internal combustion engine 52 flows through the core upstream side communication path 4f to the heater flow path 4c at the upstream side of the heater core 43. On the other hand, if the third three-way valve 44 is set to the second state, the cooling water flowing out from the cooling water flow path of the internal combustion engine 52 flows through the core downstream side communication path 4g and flows into the heater flow path 4c at the downstream side of the heater core 43. Note that, if possible to suitably adjust the flow rate of the cooling water flowing from the engine outflow flow path 4e to the core upstream side communication path 4f and core downstream side communication path 4g, it is also possible to use a regulating valve or on-off valve or other circulation mode control device instead of the third three-way valve 44.

The third solenoid regulating valve 45 and fourth solenoid regulating valve 46 are used as the second circulation mode control device for controlling the mode of circulation of cooling water in the high temperature circuit 4, in particular for controlling the mode of circulation of cooling water from the cooling water piping 22*b* of the condenser 22 to the high temperature radiator 42 and heater core 43. The larger the opening degree of the third solenoid regulating valve 45, the greater the cooling water flowing into the high temperature radiator flow path 4*b* and accordingly the greater the cooling water flowing into the high temperature radiator 42. Further, the greater the opening degree of the fourth solenoid regulating valve 46, the greater the cooling water flowing into the heater flow path 4*c* and accordingly the greater the cooling water flowing into the heater core 43. Note that, in the present embodiment, the solenoid regulating valves 45 and 46 are configured as valves able to be adjusted in opening degrees, but may also be on-off valves switched between the opened state and the closed state. Further, instead of the third solenoid regulating valve 45 and fourth solenoid regulating valve 46, a three-way valve able to make the cooling water from the high temperature basic flow path 4*a* selectively flow to only the high temperature radiator flow path 4*b*, only the heater flow path 4*c*, and/or both may be provided. Therefore, if possible to adjust the flow rate from the high temperature basic flow path 4*a* to the high temperature radiator flow path 4*b* and heater flow path 4*c*, any sort of valves may be provided as second circulation mode control devices instead of these solenoid regulating valves 45 and 46.

Next, the engine cooling circuit 5 will be explained. The engine cooling circuit 5 is provided with a third pump 51, cooling water flow path of the internal combustion engine 52, engine radiator 53, and thermostat 54. In the engine cooling circuit 5, cooling water is circulated through these components. Note that, this cooling water is one example of the first heat medium. Inside the engine cooling circuit 5, any other heat medium may be used if this heat medium is a heat medium the same as the high temperature circuit 4.

Further, the engine cooling circuit 5 is divided into an engine basic flow path 5*a*, engine radiator flow path 5*b*, and bypass flow path 5*c*. The engine radiator flow path 5*b* and the bypass flow path 5*c* are provided in parallel with each other, and are respectively connected to the engine basic flow path 5*a*.

The engine basic flow path 5*a* is provided with a third pump 51 and a cooling water flow path of the internal combustion engine 52 in that order in the direction of circulation of the cooling water. The engine radiator flow path 5*b* is provided with an engine radiator 53. Further, the engine inflow flow path 4*d* and engine outflow flow path 4*e* communicate with the bypass flow path 5*c*. In particular, the engine inflow flow path 4*d* is communicated with the downstream side part of the bypass flow path 5*c*. As a result, the engine inflow flow path 4*d* communicates with the vicinity of the inlet of the cooling water flow path of the internal combustion engine 52. On the other hand, the engine outflow flow path 4*e* communicates with the upstream side part of the bypass flow path 5*c*. As a result, the engine inflow flow path 4*d* communicates with the vicinity of the outlet of the cooling water flow path of the internal combustion engine 52. Therefore, the cooling water flow path of the internal combustion engine 52 is configured to communicate with the high temperature circuit 4 so that cooling water of the high temperature circuit 4 circulates through it. Between the engine basic flow path 5*a* and the engine radiator flow path 5*b* and bypass flow path 5*c*, a thermostat 54 is provided.

The third pump 51 pumps cooling water circulating through the engine cooling circuit 5. In the present embodiment, the third pump 51 is an electrically powered water pump which is the same type as the first pump 31. Further, the engine radiator 53 is, similarly to the low temperature radiator 32, a heat exchanger exchanging heat between the cooling water circulating through the engine cooling circuit 5 and the outside air.

The internal combustion engine 52 is configured so that when supplied with fuel, it burns the supplied fuel and generates kinetic energy. The internal combustion engine 52 becomes high in temperature along with burning of the fuel, and makes cooling water circulate through the cooling water flow path of the internal combustion engine to thereby keep the internal combustion engine 52 from excessively rising in temperature.

The thermostat 54 is a valve which is switched between a closed state which cuts off the flow of cooling water running through the engine radiator flow path 5*b* and an opened state which permits the flow of cooling water through the engine radiator flow path 5*b*. The thermostat 54 is opened to enable cooling water to flow to the engine radiator flow path 5*b* when the temperature of the cooling water circulating through the bypass flow path 5*c* is equal to or greater than a predetermined temperature. On the other hand, the thermostat 54 is closed so that cooling water does not flow to the engine radiator flow path 5*b* when the temperature of the cooling water circulating through the bypass flow path 5*c* is less than the predetermined temperature. As a result, the temperature of the cooling water circulating through the internal combustion engine 52 is held substantially constant.

FIG. 2 is a view of the configuration schematically showing the air passage 7 for air-conditioning the vehicle 100 mounting the vehicle-mounted temperature controller 1. In the air passage 7, air flows in the direction shown by the arrow marks in the figure. The air passage 7 shown in FIG. 2 is connected to the outside of the vehicle 100 or the air intake openings of the passenger compartment. The outside air or the air inside the passenger compartment flows into the air passage 7, according to the state of control by the control device 6. Further, the air passage 7 shown in FIG. 2 is connected to a plurality of air vent openings blowing air into the passenger compartment. Air is supplied from the air passage 7 to any of the air vent openings according to the state of control by the control device 6.

As shown in FIG. 2, at the air passage 7 for air-conditioning of the present embodiment, a blower 71, evaporator 26, air mix door 72, and heater core 43 are provided in that order in the direction of flow of the air.

The blower 71 is provided with a blower motor 71*a* and a blower fan 71*b*. The blower 71 is configured so that if the blower fan 71*b* is driven by the blower motor 71*a*, the outside air or the air inside the passenger compartment flows into the air passage 7 and the air flows through the air passage 7.

The air mix door 72 adjusts the flow rate of the air flowing through the heater core 43 in the air flowing through the air passage 7. The air mix door 72 is configured to be able to be adjusted among the state where all of the air flowing through the air passage 7 flows through the heater core 43, the state where none of the air flowing through the air passage 7 flows through the heater core 43, and states between them.

In the thus configured air passage 7, when the blower 71 is driven, if the refrigerant circulates through the evaporator 26, the air flowing through the air passage 7 is cooled. Further, when the blower 71 is driven, if the cooling water circulates to the heater core 43 and the air mix door 72 is controlled so that air flows through the heater core 43, the air flowing through the air passage 7 is warmed.

FIG. 3 is a view schematically showing the vehicle 100 mounting the vehicle-mounted temperature controller 1. As shown in FIG. 3, at the inside of the front grille of the vehicle 100, a low temperature radiator 32, high temperature radiator 42 and engine radiator 53 are arranged. Therefore, when the vehicle 100 is running, wind generated based on movement of vehicle strikes these radiators 32, 42 and 53. Further, a fan 76 is provided adjacent to these radiators 32, 42 and 53. The fan 76 is configured so that if driven, the air strikes the radiators 32, 42 and 53. Therefore, even when the vehicle 100 is not running, by driving the fan 76, it is possible to make air strike the radiators 32, 42 and 53.

Referring to FIG. 1, the control device 6 is provided with an electronic control unit (ECU) 61. The ECU 61 is provided with a processor for performing various types of processing, a memory storing programs and various types of information, and an interface connected with various actuators and various sensors.

Further, the control device 6 is provided with a battery temperature sensor 62 detecting the temperature of the battery, a first water temperature sensor 63 detecting the temperature of the cooling water flowing out from the cooling water piping 27b of the chiller 27, and a second water temperature sensor 64 detecting the temperature of the cooling water flowing into the condenser 22. The ECU 61 is connected to these sensors, and output signals from these sensors are input to the ECU 61.

In addition, the ECU 61 is connected to various types of actuators of the vehicle-mounted temperature controller 1 and controls these actuators. Specifically, the ECU 61 is connected to the compressor 21, the solenoid regulating valves 28, 29, 45 and 46, the pumps 31, 41 and 51, the three-way valves 33, 34, and 43, the electric heater 44, the blower motor 71a, the air mix door 72, and the fan 76 and controls the same.

Operation of Vehicle-Mounted Temperature Controller

Next, referring to FIGS. 4 to 11, typical operating states of the vehicle-mounted temperature controller 1 will be explained. In FIGS. 4 to 11, a flow path through which the refrigerant or the cooling water flows is shown by a solid line, while a flow path through which the refrigerant or cooling water does not flow is shown by a broken line. Further, thin arrow marks in the figures show flow directions of refrigerant or cooling water, and thick arrow marks in the figures show directions of movement of heat.

Figure 4:
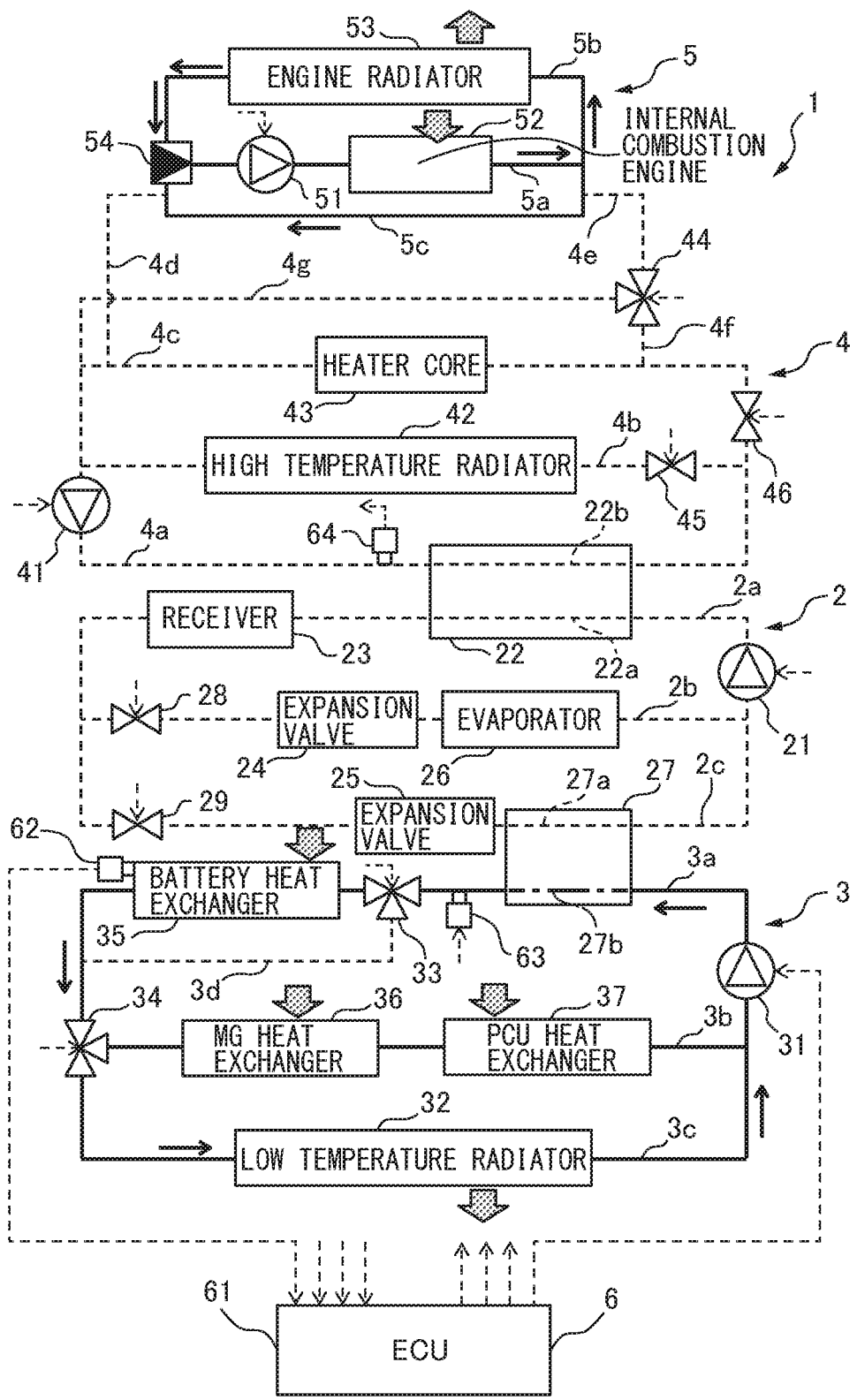
FIG. 4 shows an operating state of the vehicle-mounted temperature controller in the case where neither cooling nor heating of the passenger compartment is demanded and cooling of a battery or other heat generating device is necessary (first stopping mode).

FIG. 4 shows the operating state of the vehicle-mounted temperature controller 1 in the case where neither cooling nor heating of the passenger compartment is demanded and cooling of a heat generating device such as the battery is required (first stopping mode).

As shown in FIG. 4, in the first stopping mode, the compressor 21 and the second pump 41 are stopped from operating. Therefore, in the refrigeration circuit 2, no refrigerant circulates. Further, in the high temperature circuit 4, no cooling water circulates. On the other hand, in the first stopping mode, the first pump 31 is driven. Therefore, inside the low temperature circuit 3, cooling water circulates.

Further, in the first stopping mode, the first three-way valve 33 is set so that cooling water circulates through the battery heat exchanger 35. Further, in the example shown in FIG. 4, the second three-way valve 34 is set so that the cooling water flows to both of the low temperature radiator flow path 3b and heat generating device flow path 3c. However, the second three-way valve 34 may also be set so that the cooling water flows to only the low temperature radiator flow path 3b.

As a result, in the first stopping mode, in the battery heat exchanger 35, MG heat exchanger 36 and PCU heat exchanger 37 (hereinafter, these are referred to as "heat exchanger of heat generating device"), the heat of the battery, MG and PCU (heat generating device or heat generator) is transferred to the cooling water. For this reason, the heat generating device is cooled and the temperature of the cooling water rises to equal to or greater than the temperature of the outside air. After that, the cooling water is cooled at the low temperature radiator 32 by heat exchange with the outside air, and again flows into the heat exchangers of heat generating device. Therefore, in the first stopping mode, heat is absorbed from the heat generating device at the heat exchanger of heat generating device and that heat is discharged at the low temperature radiator 32.

Note that, in the example shown in FIG. 4, at this time, the internal combustion engine 52 is operating. For this reason, the third pump 51 is driven, and cooling water is circulated in the engine cooling circuit 5. If the temperature of the cooling water in the engine cooling circuit 5 is high, the thermostat 54 opens and cooling water is circulated to the engine radiator 53 as well. Further, when the internal combustion engine 52 is stopped, the operation of the third pump 51 is stopped and accordingly cooling water is not circulated in the engine cooling circuit 5.

Figure 5:
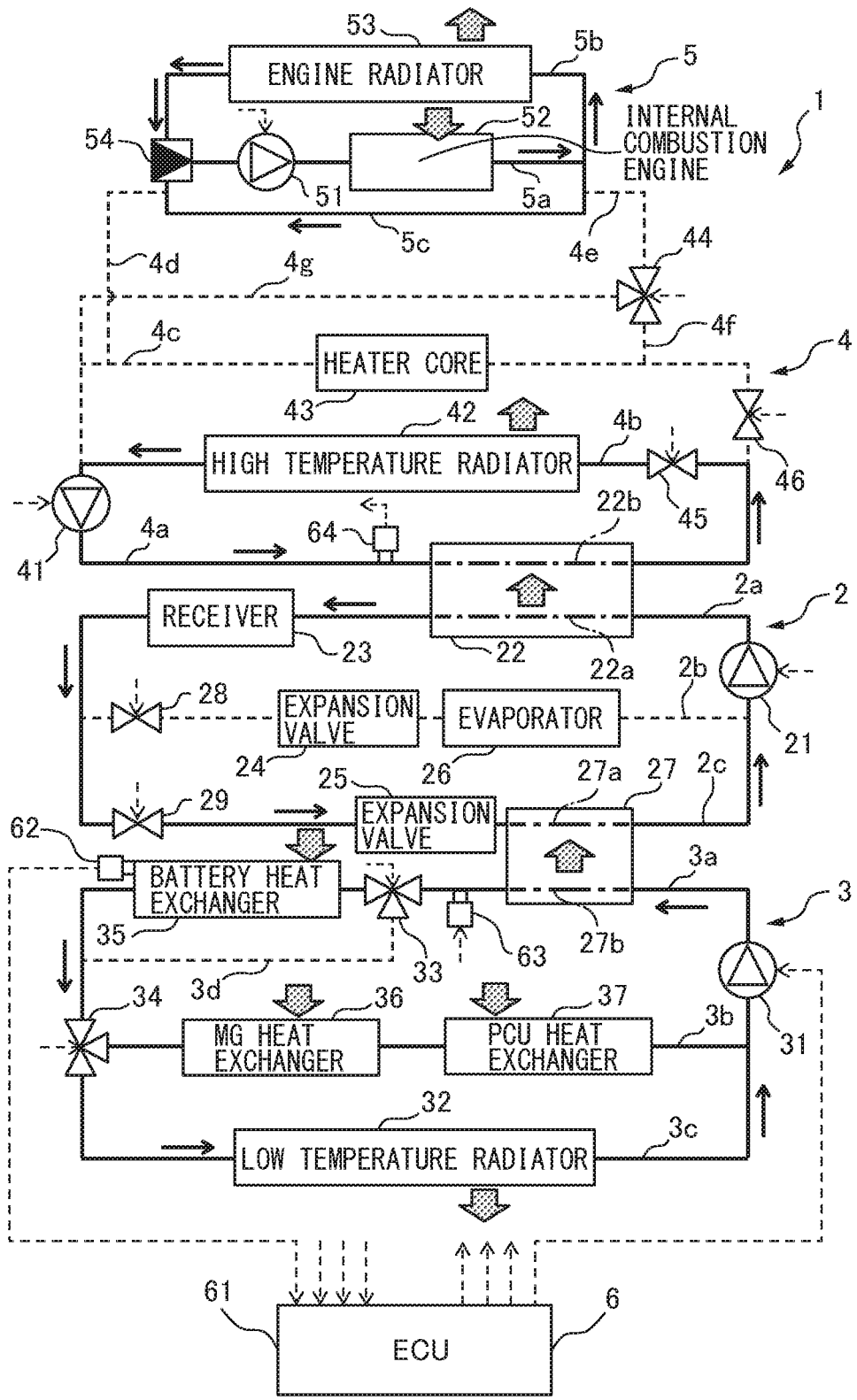
FIG. 5 shows an operating state of the vehicle-mounted temperature controller in the case where neither cooling nor heating of the passenger compartment is demanded and rapid cooling of a heat generating device is necessary (second stopping mode).

FIG. 5 shows the operating state of the vehicle-mounted temperature controller 1 in the case where neither cooling nor heating of the passenger compartment is demanded and rapid cooling of a heat generating device is required (second stopping mode). Further, in the example shown in FIG. 5, the internal combustion engine 52 is operating.

As shown in FIG. 5, in the second stopping mode, all of the compressor 21, first pump 31, and second pump 41 are operated. Therefore, the refrigerant or cooling water is circulated in all of the refrigeration circuit 2, low temperature circuit 3, and high temperature circuit 4.

Further, in the second stopping mode, the first solenoid regulating valve 28 is closed and the second solenoid regulating valve 29 is opened. Therefore, refrigerant does not flow to the evaporator 26, while refrigerant flows to the chiller 27. In addition, in the second stopping mode, the first three-way valve 33 is set so that the cooling water flows to the battery heat exchanger 35. Further, in the example shown in FIG. 5, the second three-way valve 34 is set so that the cooling water flows to both of the low temperature radiator flow path 3b and heat generating device flow path 3c. Due to this, cooling water flows to the MG heat exchanger 36 and PCU heat exchanger 37 as well, therefore the MG and PCU can be cooled. However, the second three-way valve 34 may also be set so that the cooling water flows to only the low temperature radiator flow path 3b. Furthermore, in the second stopping mode, the third solenoid regulating valve 45 is opened, and the fourth solenoid regulating valve 46 is closed. Therefore, the cooling water in the high temperature circuit 4 flows through the condenser 22, then flows into the high temperature radiator flow path 4b.

As a result, in the second stopping mode, the heat of the cooling water in the low temperature circuit 3 is transferred by the chiller 27 to the refrigerant, whereupon this cooling water is cooled. After that, this low temperature cooling water flows to the battery heat exchanger 35 or other heat generating device heat exchanger, whereupon the heat generating device is cooled. On the other hand, the heat of the refrigerant is transferred by the condenser 22 to the high temperature circuit 4, whereupon the cooling water in the high temperature circuit 4 is warmed. After that, this high temperature cooling water is cooled at the high temperature radiator 42 by exchange of heat with the outside air, and again flows into the condenser 22. Therefore, in the second stopping mode, heat is absorbed from the heat generating device by the heat exchanger of the heat generating device and that heat is discharged at the high temperature radiator 42.

Figure 6:
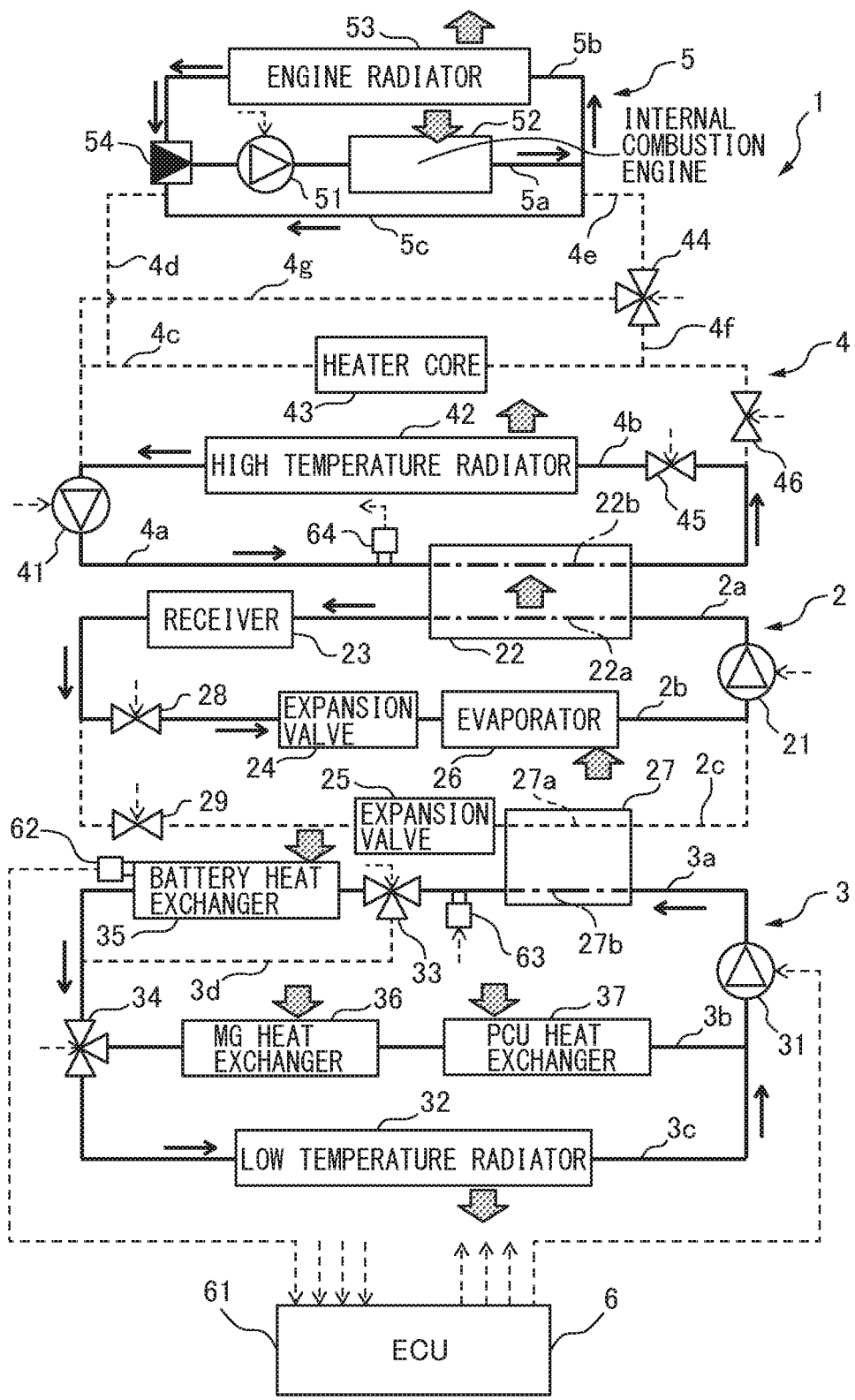
FIG. 6 shows an operating state of the vehicle-mounted temperature controller in the case where cooling of the passenger compartment is demanded and cooling of a heat generating device is necessary (first cooling mode).

FIG. 6 shows the operating state of the vehicle-mounted temperature controller 1 in the case where cooling of the passenger compartment is demanded and a heat generating device has to be cooled (first cooling mode). Further, in the example shown in FIG. 6, the internal combustion engine 52 is operating.

As shown in FIG. 6, in the first cooling mode, all of the compressor 21, first pump 31, and second pump 41 are operated. Further, in the first cooling mode, the first solenoid regulating valve 28 is opened and the second solenoid regulating valve 29 is closed, Further, the third solenoid regulating valve 45 is opened and the fourth solenoid regulating valve 46 is closed. Further, in the example shown in FIG. 6, the second three-way valve 34 is set so that the cooling water flows to both of the low temperature radiator flow path 3*b* and heat generating device flow path 3*c*. However, the second three-way valve 34 may also be set so that the cooling water flows to only the low temperature radiator flow path 3*b*.

As a result, in the first cooling mode, at the evaporator 26, the heat of the surrounding air is transferred to the refrigerant, whereupon the surrounding air is cooled. On the other hand, at the condenser 22, the heat of the refrigerant is transferred to the high temperature circuit 4, whereupon the cooling water in the high temperature circuit 4 is warmed. After that, this high temperature cooling water is cooled at the high temperature radiator 42 by exchange of heat with the outside air, and again flows into the condenser 22. Therefore, in the first cooling mode, heat is absorbed from the surrounding air at the evaporator 26 and that heat is discharged at the high temperature radiator 42.

Further, in the first cooling mode, at the heat exchanger of the heat generating device, the heat of the heat generating device is transferred to the cooling water. After that, the cooling water is cooled by exchange of heat with the outside air at the low temperature radiator 32, and again flows into the battery heat exchanger 35. Therefore, in the first cooling mode, heat is absorbed from the surrounding air at the evaporator 26 and that heat is discharged at the high temperature radiator 42. At the heat exchanger of the heat generating device, heat is absorbed from the heat generating device and that heat is discharged at the low temperature radiator 32.

Figure 7:
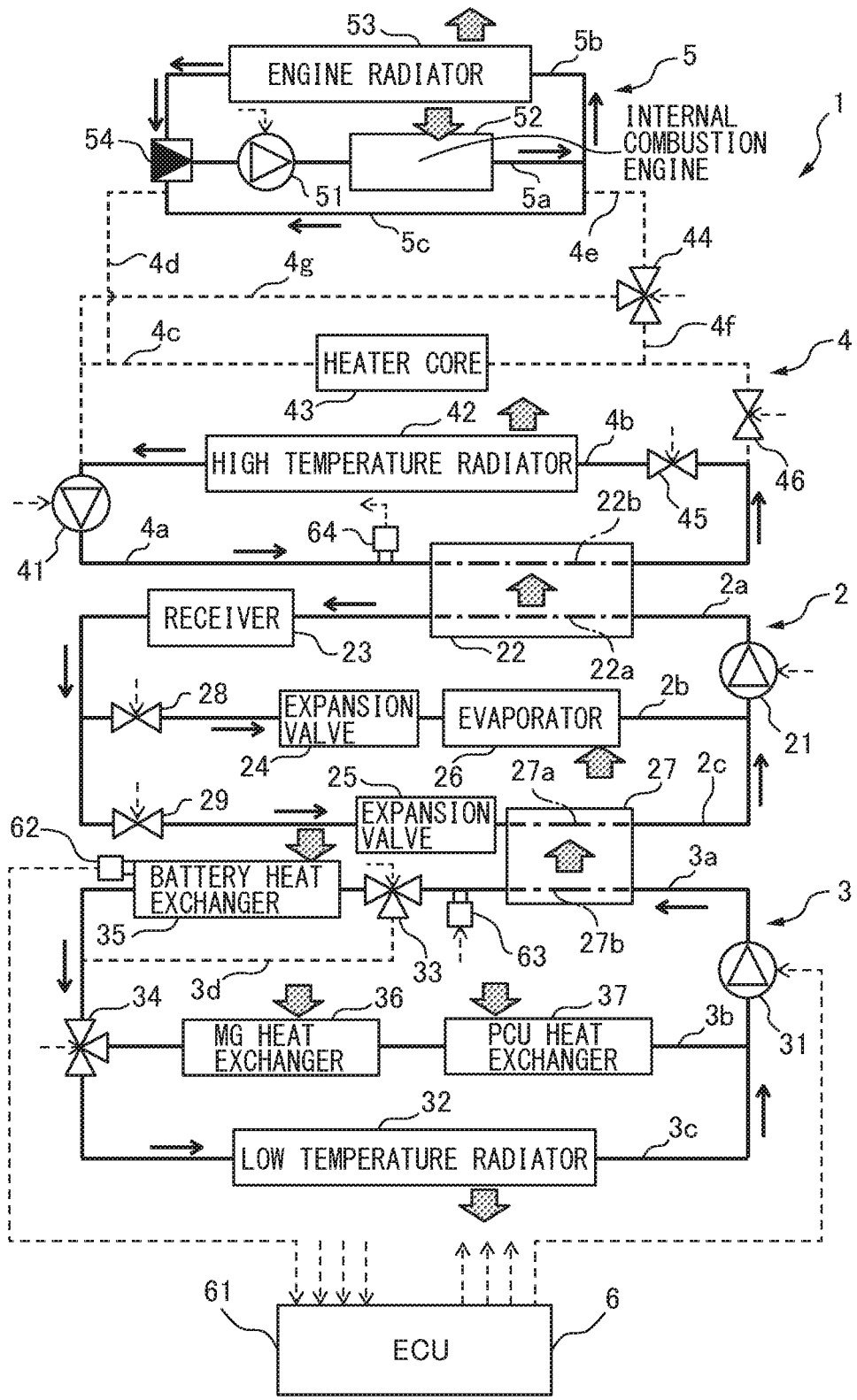
FIG. 7 shows an operating state of the vehicle-mounted temperature controller in the case where cooling of the passenger compartment is demanded and rapid cooling of a heat generating device is necessary (second cooling mode).

FIG. 7 shows the operating state of the vehicle-mounted temperature controller 1 in the case where cooling of the passenger compartment is demanded and rapid cooling of the heat generating device is necessary (second cooling mode).

As shown in FIG. 7, in the second cooling mode, all of the compressor 21, first pump 31, and second pump 41 are operated. Further, in the second cooling mode, both of the first solenoid regulating valve 28 and the second solenoid regulating valve 29 are opened. Accordingly, refrigerant flows to both of the evaporator 26 and the chiller 27. The opening degrees of the solenoid regulating valves 28 and 29 at this time are adjusted in accordance with the cooling strength or temperature of the battery. In addition, in the second cooling mode, the first three-way valve 33 is set so that the cooling water flows to the battery heat exchanger 35. Further, in the example shown in FIG. 7, the second three-way valve 34 is set so that cooling water flows to both of the low temperature radiator flow path 3*b* and heat generating device flow path 3*c*. However, the second three-way valve 34 may also be set so that the cooling water flows to only the low temperature radiator flow path 3*b*. Furthermore, in the second cooling mode, the third solenoid regulating valve 45 is opened, and the fourth solenoid regulating valve 46 is closed.

As a result, in the second cooling mode, at the chiller 27, the heat of the cooling water in the low temperature circuit 3 is transferred to the refrigerant, whereupon this cooling water is cooled. After that, this low temperature cooling water flows to the heat exchanger of the heat generating device, whereupon the heat generating device is cooled. Further, in the second cooling mode, at the evaporator 26, the heat of the surrounding air is transferred to the refrigerant, whereupon the surrounding air is cooled. On the other hand, at the condenser 22, the heat of the refrigerant is transferred to the high temperature circuit 4, whereupon the cooling water in the high temperature circuit 4 is warmed. After that, this high temperature cooling water is cooled at the high temperature radiator 42 by exchange of heat with the outside air, and again flows into the condenser 22. Therefore, in the second cooling mode, heat is absorbed from the heat generating device at the heat exchanger of the heat generating device, heat is absorbed from the surrounding air at the evaporator 26, and the heat is discharged at the high temperature radiator 42.

Figure 8:
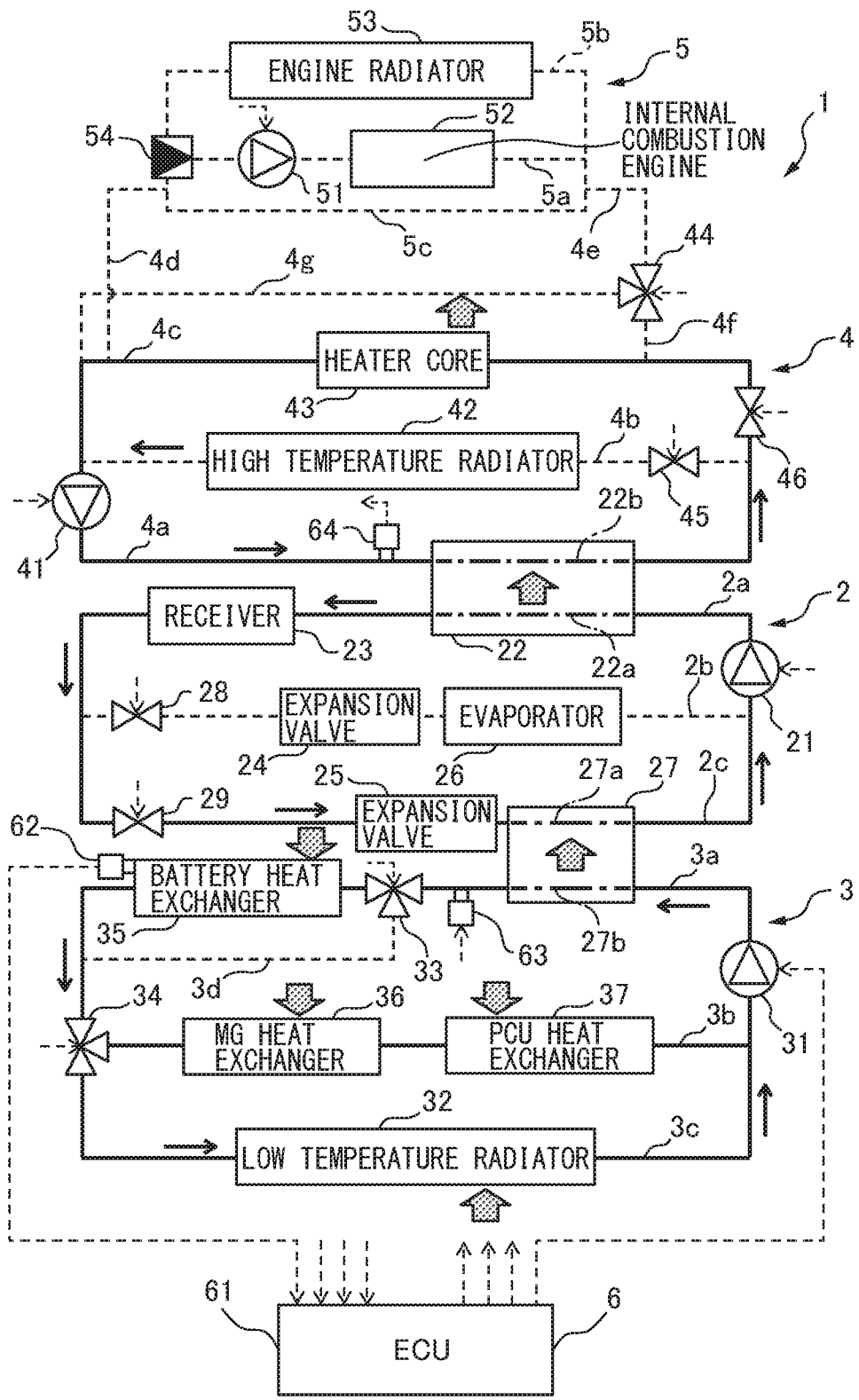
FIG. 8 shows an operating state of the vehicle-mounted temperature controller in the case where heating of the passenger compartment is demanded and the internal combustion engine is stopped (first heating mode).

FIG. 8 shows the operating state of the vehicle-mounted temperature controller 1 in the case where heating of the passenger compartment is demanded and the internal combustion engine is stopped (first heating mode).

As shown in FIG. 8, in the first heating mode, all of the compressor 21, first pump 31, and second pump 41 are operated. Further, in the first heating mode, the first solenoid regulating valve 28 is closed and the second solenoid regulating valve 29 is opened. Therefore, the refrigerant does not flow through the evaporator 26, while the refrigerant flows through the chiller 27. In addition, in the first heating mode, the first three-way valve 33 is set so that the cooling water flows to the battery heat exchanger 35. Further, in the example shown in FIG. 8, the second three-way valve 34 is set so that the cooling water flows to both of the low temperature radiator flow path 3*b* and heat generating device flow path 3*c*. However, the second three-way valve 34 may also be set so that the cooling water flows to only the low temperature radiator flow path 3*b*. Furthermore, in the first heating mode, the third solenoid regulating valve 45 is closed, while the fourth solenoid regulating valve 46 is opened. Therefore, the cooling water in the high temperature circuit 4 flows through the condenser 22, then flows into the heater flow path 4*c*. Further, the internal combustion engine 52 is stopped and accordingly the third pump 51 is also stopped. For this reason, the cooling water does not flow through the engine inflow flow path 4*d* and engine outflow flow path 4*e*.

As a result, in the first heating mode, at the chiller 27, the heat of the cooling water in the low temperature circuit 3 is transferred to the refrigerant, whereupon this cooling water is cooled. If, as shown in FIG. 8, the first three-way valve 33 is set so that the cooling water flows to the battery heat exchanger 35, this low temperature cooling water flows to the battery heat exchanger 35 and low temperature radiator 32 where heat from the battery and outside air is absorbed by the cooling water.

Further, at the condenser 22, the heat of the refrigerant is transferred to the high temperature circuit 4, whereupon the cooling water in the high temperature circuit 4 is warmed. After that, this high temperature cooling water is cooled at the heater core 43 by exchange of heat with the surrounding air. Along with this, the surrounding air is raised in temperature. Therefore, in the first heating mode, at the low temperature radiator 32, heat is absorbed from the outside air. Sometimes, heat is absorbed from the battery at the battery heat exchanger 35 and that heat is discharged at the heater core 43.

Figure 9:
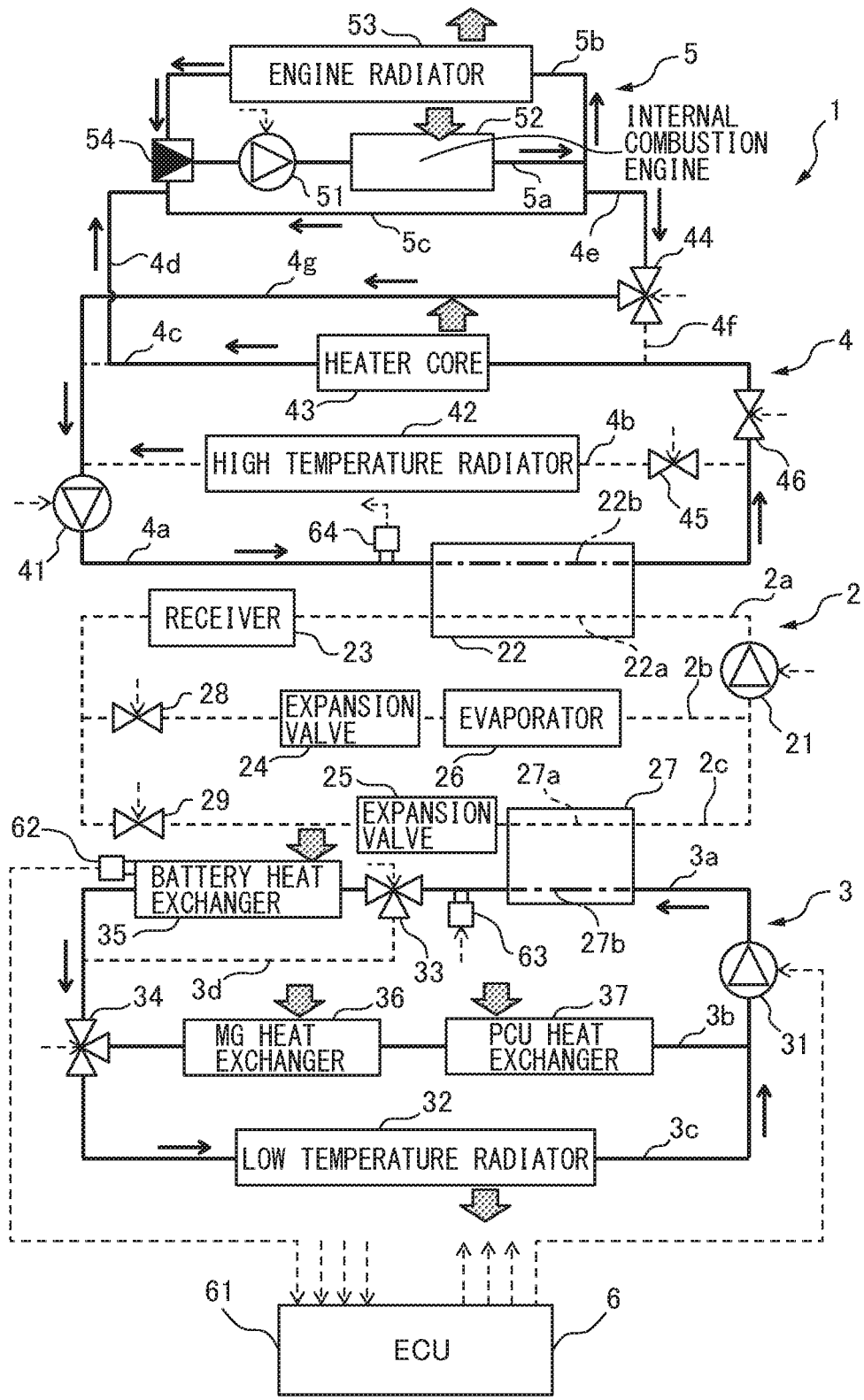
FIG. 9 shows an operating state of the vehicle-mounted temperature controller in the case where heating of the passenger compartment is demanded and the internal combustion engine is being operated and where dehumidification is not demanded (second heating mode).

FIG. 9 shows the operating state of the vehicle-mounted temperature controller 1 in the case where heating of the passenger compartment is demanded and the internal combustion engine is being operated and where dehumidification is not demanded (second heating mode).

As shown in FIG. 9, in the second heating mode, the compressor 21 is stopped. Therefore, the refrigerant is not circulated in the refrigeration circuit 2. Further, as shown in FIG. 9, the first pump 31, the second pump 41 and third pump 51 are all operated. Therefore, cooling water is circulated at the low temperature circuit 3, high temperature circuit 4, and engine cooling circuit 5.

Further, in the second heating mode, the third solenoid regulating valve 45 is closed, and the fourth solenoid regulating valve 46 is opened. Therefore, the cooling water in the high temperature circuit 4 flows through the condenser 22, then flows into the heater flow path 4c.

In addition, in the second heating mode, the third pump 51 of the engine cooling circuit 5 is driven and the third three-way valve 44 is set to the second state. Therefore, the engine outflow flow path 4e communicates with the core downstream side communication path 4g. As a result, part of the cooling water flowing out from the heater core 43 flows through the engine inflow flow path 4d to the engine cooling circuit 5. Further, part of the cooling water flowing out from the cooling water flow path of the internal combustion engine 52 at the engine cooling circuit 5 flows through the engine outflow flow path 4e and core downstream side communication path 4g, and flows into the heater flow path 4c at the downstream side of the heater core 43. That is, that part of the cooling water flows into the core downstream side part. Therefore, the cooling water warmed at the cooling water flow path of the internal combustion engine 52 then does not flow through the core upstream side communication path 4f and directly flow into heater core 43, but flows through the cooling water piping 22b of the condenser 22 then flows into the heater core 43.

In addition, in the second heating mode, the cooling water in the low temperature circuit 3 circulates through the low temperature circuit 3 in the same way as the first stopping mode. Therefore, in the second heating mode, heat is absorbed from the heat generating device at the heat exchanger of the heat generating device and that heat is discharged at the low temperature radiator 32.

As a result, in the second heating mode, part of the cooling water in the engine cooling circuit 5 raised in temperature by the heat of the internal combustion engine in the cooling water flow path of the internal combustion engine 52 flows through the engine outflow flow path 4e and flows into the high temperature circuit 4. This high temperature cooling water flows through the core downstream side communication path 4g and cooling water piping 22b of the condenser 22 and flows into the heater core 43. The cooling water flowing into the heater core 43 is cooled at the heater core 43 by exchanging heat with the surrounding air. Along with this, the surrounding air is raised in temperature. Therefore, in the second heating mode, heat is absorbed from the internal combustion engine at the cooling water flow path of the internal combustion engine 52 and that heat is discharged at the heater core 43. In addition, in the second heating mode, heat is absorbed from the heat generating device at the heat exchanger of the heat generating device and that heat is discharged at the low temperature radiator 32.

Figure 10:
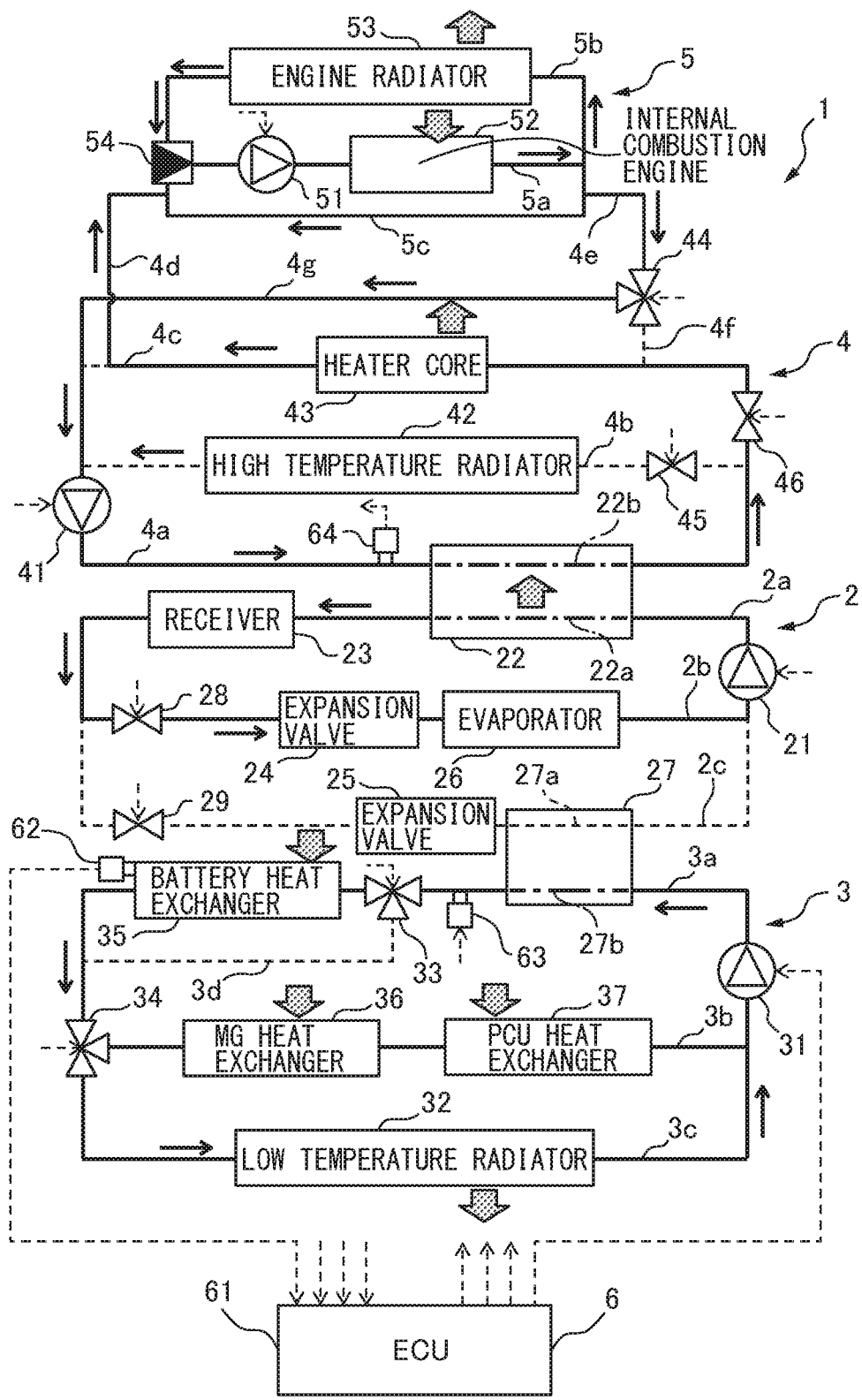
FIG. 10 shows an operating state of the vehicle-mounted temperature controller in the case where heating of the passenger compartment is demanded and the internal combustion engine is being operated and where dehumidification is demanded (third heating mode).

FIG. 10 shows the operating state of the vehicle-mounted temperature controller 1 in the case where heating of the passenger compartment is demanded and the internal combustion engine is being operated and where dehumidification is demanded (third heating mode). In particular, the third heating mode is selected when the temperature of the cooling water flowing through the high temperature circuit 4 is not that high.

As shown in FIG. 10, in the third heating mode, the compressor 21, first pump 31, second pump 41, and third pump 51 are all operated. Therefore, the refrigerant is circulated in the refrigeration circuit 2. At the low temperature circuit 3, high temperature circuit 4, and engine cooling circuit 5, cooling water is circulated.

Further, in the third heating mode, similarly to the second heating mode, the third solenoid regulating valve 45 is closed, while the fourth solenoid regulating valve 46 is opened. Therefore, the cooling water in the high temperature circuit 4 flows through the condenser 22, then flows into the heater flow path 4c.

In addition, in the third heating mode, similarly to the second heating mode, the third pump 51 of the engine cooling circuit 5 is driven and the third three-way valve 44 is set to the second state. Therefore, part of the cooling water flowing out from the heater core 43 flows through the engine inflow flow path 4d and flows into the engine cooling circuit 5. Further, part of the cooling water flowing out from the cooling water flow path of the internal combustion engine 52 flows through the engine outflow flow path 4e and core downstream side communication path 4g and flows into the heater flow path 4c at the downstream side of the heater core 43.

Further, at the third heating mode, the cooling water in the low temperature circuit 3 circulates in the low temperature circuit 3 similarly to the first stopping mode. Therefore, in the second heating mode, heat is absorbed from the heat generating device at the heat exchanger of the heat generating device and that heat is discharged at the low temperature radiator 32.

As a result, at the third heating mode, at the cooling water flow path of the internal combustion engine 52, part of the cooling water in the engine cooling circuit 5 raised in temperature by the heat of the internal combustion engine flows through the engine outflow flow path 4e and flows into the high temperature circuit 4. This high temperature cooling water flows through the core downstream side communication path 4g and cooling water piping 22b of the condenser 22 and flows into the heater core 43. The cooling water flowing into the heater core 43 is cooled at the heater core 43 by exchange of heat with the surrounding air. Along with this, the surrounding air is raised in temperature.

Further, in the third heating mode, at the evaporator 26, heat of the surrounding air is transferred to the refrigerant, whereupon the surrounding air is cooled. On the other hand, at the condenser 22, heat of the refrigerant is transferred to the high temperature circuit 4, whereupon the cooling water in the high temperature circuit 4 is warmed. In particular, in the third heating mode, the temperature of the cooling water flowing through the high temperature circuit 4 is not that high, therefore at the condenser 22, heat is transferred from the refrigerant to the cooling water of the high temperature circuit 4 relatively efficiently. Therefore, at the third heating mode, heat is absorbed from the internal combustion engine at the cooling water flow path of the internal combustion engine 52, heat is absorbed from the surrounding air at the evaporator 26, and that heat is discharged at the heater core 43. Furthermore, in the third heating mode, heat is absorbed from the heat generating device at the heat exchanger of the heat generating device, and that heat is discharged at the low temperature radiator 32.

As a result, the air flowing through the air passage 7 first is cooled by the evaporator 26. As a result, the amount of saturated water vapor in the air becomes smaller, and thus part of the water vapor condenses to form drops of water. After that, the cooled air is warmed by the heater core 43. As a result, the low humidity dehumidified air flows from the vents into the passenger compartment.

Figure 11:
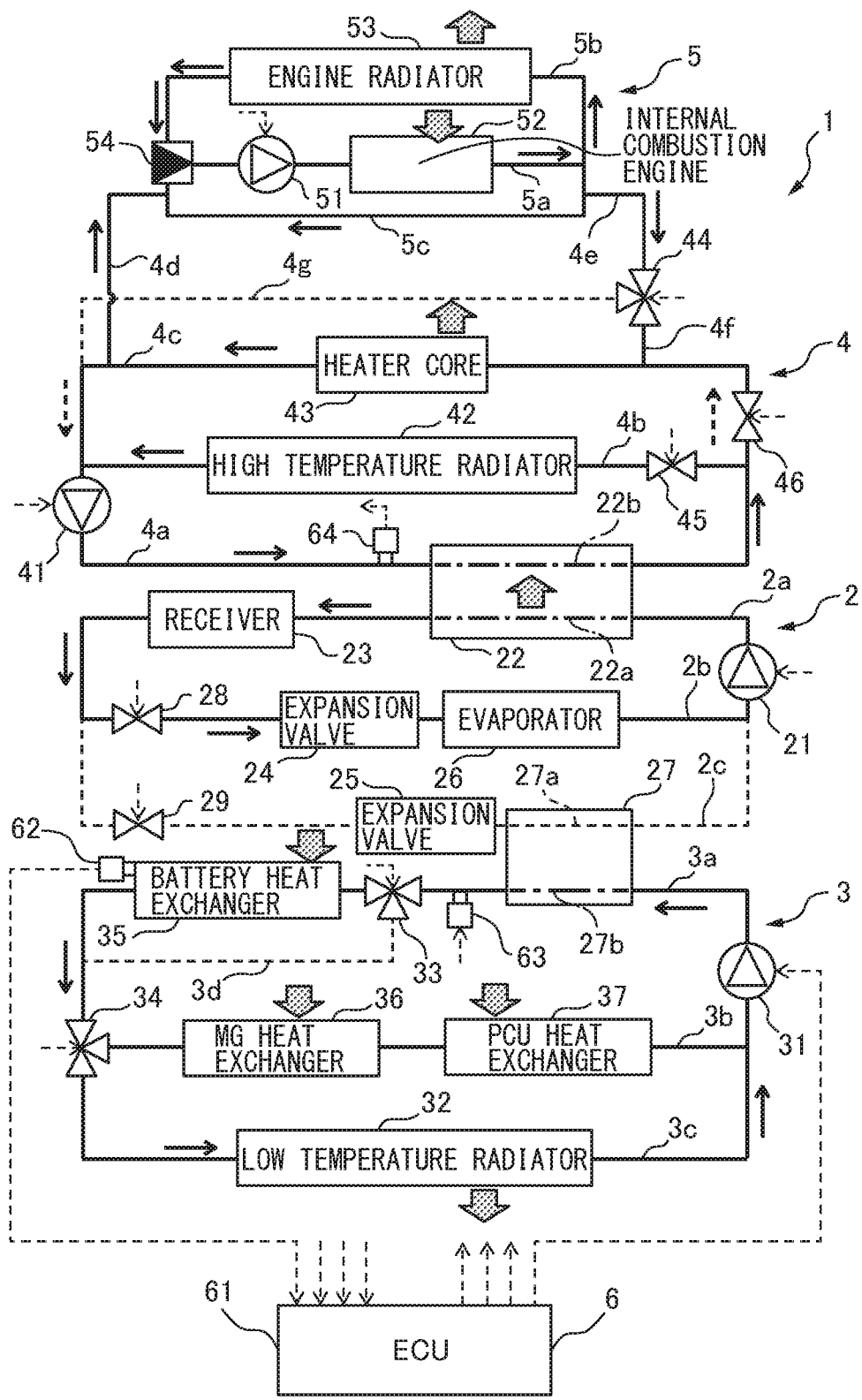
FIG. 11 shows an operating state of the vehicle-mounted temperature controller in the case where heating of the passenger compartment is demanded and the internal combustion engine is being operated and where dehumidification is demanded and the temperature of the cooling water flowing through the high temperature circuit is high (fourth heating mode).

FIG. 11 shows the operating state of the vehicle-mounted temperature controller 1 in the case where heating of the passenger compartment is demanded and the internal combustion engine is being operated and where dehumidification is demanded (fourth heating mode). In particular, the fourth heating mode is selected when the temperature of the cooling water flowing through the high temperature circuit 4 is high.

As shown in FIG. 11, in the fourth heating mode, the compressor 21, first pump 31, second pump 41, and third pump 51 are all operated. Therefore, the refrigerant is circulated in the refrigeration circuit 2 and cooling water is circulated at the low temperature circuit 3, high temperature circuit 4, and engine cooling circuit 5.

Further, in the fourth heating mode, the third solenoid regulating valve 45 is set to a large opening degree, and the fourth solenoid regulating valve 46 is set to a small opening degree. Therefore, the cooling water in the high temperature circuit 4 flows through the condenser 22, then mainly flows into the high temperature radiator flow path 4b and flows just slightly to the heater flow path 4c. Note that, in the present embodiment, in the fourth heating mode, the third solenoid regulating valve 45 may be fully opened and the fourth solenoid regulating valve 46 may be fully closed.

In addition, in the fourth heating mode, the third pump 51 of the engine cooling circuit 5 is driven, and the third three-way valve 44 is set to the first state. Therefore, the engine outflow flow path 4e is communicated with the core upstream side communication path 4f. As a result, part of the cooling water flowing out from the heater core 43 flows through the engine inflow flow path 4d and flows into the engine cooling circuit 5. Further, part of the cooling water flowing out from the cooling water flow path of the internal combustion engine 52 at the engine cooling circuit 5 flows through the engine outflow flow path 4e and core upstream side communication path 4f and flows into the heater flow path 4c at the upstream side of the heater core 43. That is, this part of the cooling water flows into the core upstream side part. Therefore, the cooling water warmed at the cooling water flow path of the internal combustion engine 52 then does not flow through the cooling water piping 22b of the condenser 22, but flows through the core upstream side communication path 4f and directly flows into the heater core 43. That is, the cooling water flowing through the heater core 43 does not flow through the condenser 22, but circulates with the cooling water flow path of the internal combustion engine 52. At this time, the cooling water flowing through the heater core 43 is circulated by the third pump 51.

On the other hand, at the fourth heating mode, at the evaporator 26, heat of the surrounding air is transferred to the refrigerant, whereupon the surrounding air is cooled. Further, at the condenser 22, the heat of the refrigerant is transferred to the high temperature circuit 4 and the cooling water in the high temperature circuit 4 is warmed. The opening degree of the third solenoid regulating valve 45 is large, therefore the cooling water warmed at the condenser 22 basically flows into the high temperature radiator 42, is cooled at the high temperature radiator 42 by exchanging heat with the outside air, and again flows into the condenser 22. Here, in the fourth heating mode, the temperature of the cooling water flowing through the high temperature circuit 4 is high, but the relatively low temperature cooling water cooled by flowing through the high temperature radiator 42 flows into the condenser 22. For this reason, at the condenser 22, heat is transferred from the refrigerant to the cooling water of the high temperature circuit 4 relatively efficiently.

Further, in the fourth heating mode, the cooling water in the low temperature circuit 3 circulates through the low temperature circuit 3 similarly to the first stopping mode. Therefore, in the fourth heating mode, heat is absorbed from the heat generating device at the heat exchanger of the heat generating device and that heat is discharged at the low temperature radiator 32.

As explained above, in the fourth heating mode, part of the cooling water in the engine cooling circuit 5 raised in temperature by the heat of the internal combustion engine at the cooling water flow path of the internal combustion engine 52, flows through the engine outflow flow path 4e and flows into the high temperature circuit 4. This high temperature cooling water flows through the core upstream side communication path 4f and flows into the heater core 43. The cooling water flowing into the heater core 43 is cooled at the heater core 43 by exchange of heat with the surrounding air. Along with this, the surrounding air is raised in temperature. Further, in the fourth heating mode, heat is absorbed from the surrounding air at the evaporator 26 and that heat is discharged at the high temperature radiator 42. Furthermore, in the fourth heating mode, heat is absorbed from the heat generating device at the heat exchanger of the heat generating device, and that heat is discharged at the low temperature radiator 32.

As a result, the air flowing through the air passage 7 is first cooled by the evaporator 26. As a result, the amount saturated water vapor in the air becomes smaller, and part of the water vapor condenses to become drops of water. After that, the cooled air is warmed by the heater core 43. As a result, the low humidity dehumidified air flows from the vents into the passenger compartment.

Control of Three-Way Valve and Solenoid Regulating Valve

Figure 12:
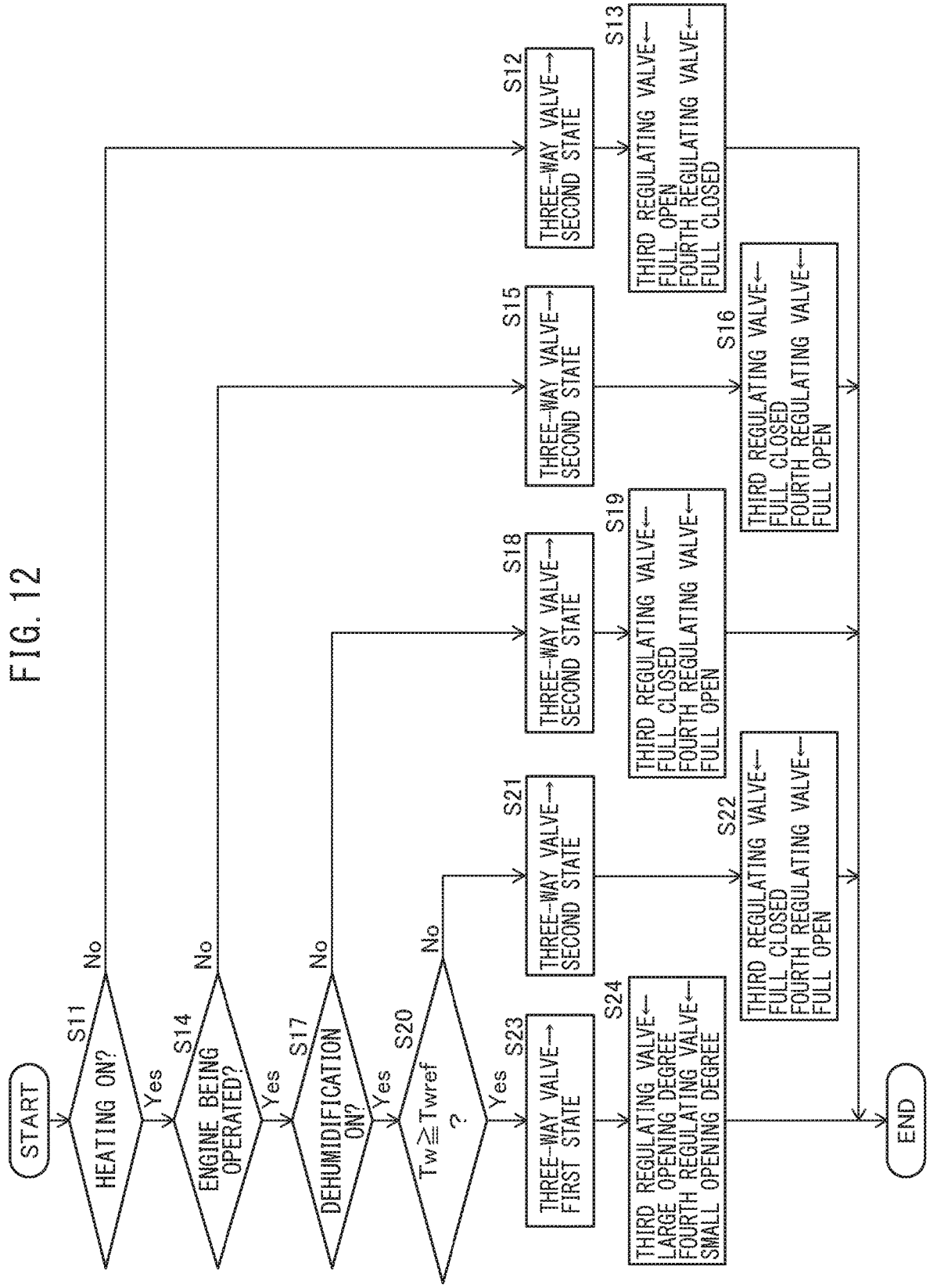
FIG. 12 is a flow chart showing a control routine for controlling a third three-way valve, third solenoid regulating valve, and fourth solenoid regulating valve.

FIG. 12 is a flow chart showing the control routine for controlling the third three-way valve 44, third solenoid regulating valve 45, and fourth solenoid regulating valve 46. The illustrated control routine is performed every certain time interval.

First, at step S11, it is determined if the heating demand of the vehicle 100 is set to ON. The ON/OFF state of the heating demand of the vehicle 100 may, for example, be switched automatically based on the temperature set by the user, the temperature in the passenger compartment, etc. It may also be directly switched by the user using a switch, etc. If, at step S11, it is determined that the heating demand of the vehicle 100 is not set to ON, the control routine proceeds to step S12. At step S12, the third three-way valve 44 is set to the second state. Next, at step S13, the third solenoid regulating valve 45 is set to full open and the fourth solenoid regulating valve 46 is set to full closed. At this time, the vehicle-mounted temperature controller 1 is operated in any of the first stopping mode, second stopping mode, first cooling mode, and second cooling mode.

On the other hand, if, at step S11, it is determined that the heating demand of the vehicle 100 is set to ON, the control routine proceeds to step S14. At step S14, for example, it is determined if the internal combustion engine 52 is operating, based on the output of a rotational speed sensor (not shown) detecting the rotational speed of the internal combustion engine 52. If, at step S14, it is determined that the internal combustion engine 52 is not being operated, the control routine proceeds to step S15. At step S15, the third three-way valve 44 is set to the second state, then at step S16, the third solenoid regulating valve 45 is set to full closed, and the fourth solenoid regulating valve 46 is set to full open. At this time, the vehicle-mounted temperature controller 1 is operated in the first heating mode shown in FIG. 8.

If, at step S14, it is determined that the internal combustion engine 52 is being operated, the control routine proceeds to step S17. At step S17, it is determined if the dehumidification demand of the vehicle 100 is set to ON. The ON/OFF state of the dehumidification demand of the vehicle 100 may also, for example, be automatically switched, based on the temperature set by the user, the temperature in the passenger compartment, etc. or may be directly switched by the user by a switch, etc. If, at step S17, it is determined that the dehumidification demand of the vehicle 100 is not set to ON, the control routine proceeds to step S18. At steps S18 and S19, the third three-way valve 44, third solenoid regulating valve 45, and fourth solenoid regulating valve 46 are set in the same way as steps S15 and S16. At this time, the vehicle-mounted temperature controller 1 is operated in the second heating mode shown in FIG. 9.

If, at step S17, it is determined that the dehumidification demand of the vehicle 100 is set to ON, the control routine proceeds to step S20. At step S20, it is determined if the temperature of the cooling water Tw detected by the second water temperature sensor 64 is equal to or greater than a predetermined reference temperature Twref. Here, the reference temperature Twref is set to a temperature of less than the temperature where if the temperature of the cooling water becomes that value or higher, at the condenser 22, the difference between the temperature of the cooling water and the temperature of the refrigerant becomes smaller and heat can no longer be efficiently exchanged at the condenser 22. If, at step S20, it is determined that the temperature of the cooling water Tw is less than the reference temperature Twref, the routine proceeds to step S21. At steps S21 and S22, the third three-way valve 44, third solenoid regulating valve 45, and fourth solenoid regulating valve 46 are set in the same way as steps S15 and S16. At this time, the vehicle-mounted temperature controller 1 is operated in the third heating mode shown in FIG. 10.

If, at step S20, it is determined that the temperature of the cooling water Tw is equal to or greater than the reference temperature Twref, the routine proceeds to step S23. At step S23, the third three-way valve 44 is set to the first state, then, at step S24, the third solenoid regulating valve 45 is set to a large opening degree, and the fourth solenoid regulating valve 46 is set to a small opening degree. At this time, the vehicle-mounted temperature controller 1 is operated in the fourth heating mode shown in FIG. 11.

As will be understood from the above, the third three-way valve 44 is controlled by the presence of any heating demand in the passenger compartment by the heater core 43, the presence of any operation of the internal combustion engine 52, the presence of any dehumidification demand, and the temperature of the cooling water in the high temperature circuit 4. In particular, if the cooling water of the high temperature circuit 4 is circulating through the cooling water flow path of the internal combustion engine 52, the third three-way valve 44 is set to the first state when the temperature of the cooling water Tw is equal to or greater than the reference temperature Twref, and is set to the second state when the temperature of the cooling water Tw is less than the reference temperature Twref. Further, the third three-way valve 44 is set to the second state, when there is no dehumidification demand, in the case where the cooling water in the high temperature circuit 4 circulates through the cooling water flow path of the internal combustion engine 52.

Further, when the third three-way valve 44 is set to the first state, the third solenoid regulating valve 45 and fourth solenoid regulating valve 46 are controlled so that the amount of flow of the cooling water from the cooling water piping 22b of the condenser 22 to the heater core 43 is smaller than the amount of circulation of cooling water from the cooling water piping 22b to the high temperature radiator 42.

State of Control

Figure 13:
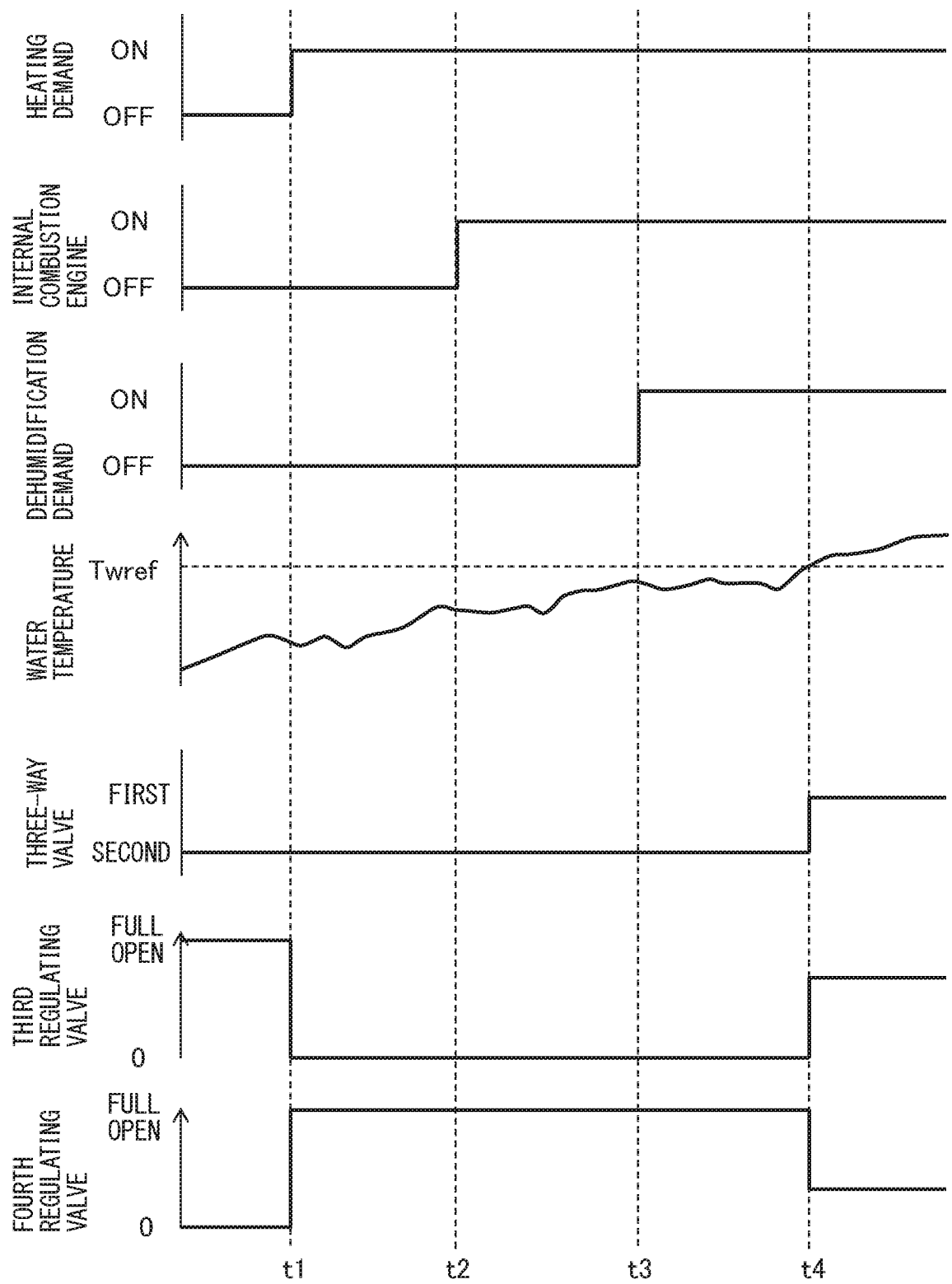
FIG. 13 is a time chart of an ON/OFF state, etc., of heating demand.

FIG. 13 is a time chart of the ON/OFF state of the heating demand, the ON/OFF state of the internal combustion engine, the ON/OFF state of the dehumidification demand, the temperature of the cooling water flowing into the cooling water piping 22b of the condenser 22, and the operating modes of the third three-way valve 44, third solenoid regulating valve 45, and fourth solenoid regulating valve 46.

In the example shown in FIG. 13, before the time t1, the heating demand and dehumidification demand are set OFF, and the internal combustion engine 52 is stopped. At this time, the third three-way valve 44 is set to the second state, while the third solenoid regulating valve 45 is set to full open and the fourth solenoid regulating valve 46 to full closed.

If, at the time t1, the heating demand is turned ON, since the internal combustion engine 52 is stopped at this time, the vehicle-mounted temperature controller 1 is operated at the first heating mode. Therefore, the third three-way valve 44 is set to the second state, while the third solenoid regulating valve 45 is set to full closed and the fourth solenoid regulating valve 46 is set to full open. Further, the cooling water in the high temperature circuit 4 is heated through the condenser 22, therefore the temperature thereof gradually rises.

If, at the time t2, the internal combustion engine is restarted, at this time, the internal combustion engine 52 is being operated and the dehumidification demand is set to OFF, therefore the vehicle-mounted temperature controller 1 is operated in the second heating mode. Therefore, the third three-way valve 44 is set to the second state, while third solenoid regulating valve 45 is set to full closed, and the fourth solenoid regulating valve 46 is set to full open.

If, at the time t3, the dehumidification request is set to ON, since the temperature of the cooling water is less than the reference temperature Twref at this time, the vehicle-mounted temperature controller 1 is operated in the third heating mode. Therefore, the third three-way valve 44 is set to the second state, while the third solenoid regulating valve 45 is set to full closed, and the fourth solenoid regulating valve 46 is set to full open.

If, at the time t4, the temperature of the cooling water becomes equal to or greater than the reference temperature Twref, the vehicle-mounted temperature controller 1 is operated in the fourth heating mode. Therefore, the third three-way valve 44 is set to the first state, while the third solenoid regulating valve 45 is set to full open, and the fourth solenoid regulating valve 46 is set to full closed.

Actions and Effects

According to the present embodiment, in the second heating mode, the cooling water does not flow through the core upstream side communication path 4f directly to the heater core 43, but flows through the cooling water piping 22b of the condenser 22, then flows into the heater core 43. Therefore, in the second heating mode as well, high temperature cooling water flows through the flow path from the cooling water piping 22b of the condenser 22 to the heater core 43. Therefore, for example, even if the internal combustion engine is stopped during performance of the second heating mode, and the vehicle-mounted temperature controller 1 is switched to the first heating mode, high temperature cooling water continues to be supplied to the heater core 43. Therefore, low temperature cooling water is kept from temporarily flowing to the heater core.

Further, when heating during operation of the internal combustion engine 52, sometimes the heat of the internal combustion engine 52 causes the temperature of the cooling water flowing through the high temperature circuit 4 to become relatively high. In such a case, if high temperature cooling water flows into the cooling water piping 22b of the condenser 22, the temperature difference between the cooling water and the refrigerant is smaller and heat cannot be efficiently exchanged at the condenser 22. As opposed to this, according to the present embodiment, when the temperature of the cooling water flowing through the high temperature circuit 4 is high, the vehicle-mounted temperature controller 1 is operated in the fourth heating mode. For this reason, relatively low temperature cooling water is supplied to the cooling water piping 22b of the condenser 22. Therefore, it is possible to efficiently exchange heat at the condenser, and accordingly possible to efficiently operate the refrigeration cycle in the refrigeration circuit 2.

Further, in the present embodiment, in the fourth heating mode, the fourth solenoid regulating valve 46 is not completely closed, but is just slightly opened. For this reason, even in the fourth heating mode, cooling water flows through the heater flow path 4c as a whole. For this reason, the temperature of the cooling water in the heater flow path 4c is maintained as is at a relatively high temperature. As a result, even when the operating mode of the vehicle-mounted temperature controller 1 was switched from the fourth heating mode to another heating mode, the low temperature cooling water is kept from temporarily flowing to the heater core 43.

Modifications

In the above embodiment, the vehicle-mounted temperature controller 1 was operated in the third heating mode or fourth heating mode, when there was a dehumidification demand. However, the vehicle-mounted temperature controller 1 may also be operated in the third heating mode or fourth heating mode, when refrigerant is being circulated in the refrigeration circuit 2 due to a demand for cooling a battery or other heat generating device or other demand instead of a dehumidification demand.

Above, an embodiment according to the present disclosure was explained, but the present disclosure is not limited to that embodiment. Various corrections and changes may be made within the language of the claims.

REFERENCE SIGNS LIST

1 vehicle-mounted temperature controller
2 refrigeration circuit
3 low temperature circuit
4 high temperature circuit
5 engine cooling circuit
6 control device
7 air passage
22 condenser
27 chiller
44 third three-way valve

The invention claimed is:

1. A vehicle-mounted temperature controller, comprising:
   a first heat circuit having a heater core used for heating an inside of a passenger compartment and a first heat exchanger and configured so that a first heat medium is circulated through the first heat exchanger,
   a refrigeration circuit having the first heat exchanger discharging heat from a refrigerant to the first heat medium to make the refrigerant condense and an evaporator making the refrigerant absorb heat to make the refrigerant evaporate, and configured to operate a refrigeration cycle by the refrigerant being circulated through the evaporator, and
   a heat medium flow path of an internal combustion engine configured to communicate with the first heat circuit to circulate the first heat medium through the heat medium flow path, wherein
   the first heat circuit is configured so that an outlet of the heat medium flow path is communicated with a core downstream side part of the first heat circuit positioned downstream of the heater core and upstream of the first heat exchanger in a direction of circulation of the first heat medium and a core upstream side part of the first heat circuit positioned downstream of the first heat exchanger and upstream of the heater core in the direction of circulation of the first heat medium, and further comprises a first valve able to switch between at least two states of a first state where the outlet of the heat medium flow path is communicated with the core upstream side part and a second state where the outlet of the heat medium flow path is communicated with the core downstream side part.

2. The vehicle-mounted temperature controller according to claim 1, wherein the first valve is configured to be controlled based on a presence of a demand for heating the inside of the passenger compartment, a presence of operation of the internal combustion engine, and a presence of a circulation of refrigerant in the refrigeration circuit.

3. The vehicle-mounted temperature controller according to claim 1,
   further comprising a temperature sensor configured to detect a temperature of the first heat medium flowing into the first heat exchanger,
   wherein the first valve is configured to be controlled based on a temperature of the first heat medium detected by the temperature sensor.

4. The vehicle-mounted temperature controller according to claim 3, wherein in response to the first heat medium in the first heat circuit being circulating through the heat medium flow path of the internal combustion engine, the first valve is set to the first state when the temperature of the first heat medium detected by the temperature sensor is equal to or greater than a reference temperature, and is set to the second state when the temperature of the first heat medium detected by the temperature sensor is less than the reference temperature.

5. The vehicle-mounted temperature controller according to claim 1, wherein in response to the first heat medium in the first heat circuit being circulating through the heat medium flow path of the internal combustion engine, the first valve is set to the second state when the refrigerant is not circulating in the refrigeration circuit.

6. The vehicle-mounted temperature controller according to claim 1, wherein the first heat circuit further comprises a radiator provided in parallel with the heater core with respect to the first heat exchanger and one or more second valves configured to control a circulation mode of the first heat medium from the first heat exchanger to the heater core and the radiator.

7. The vehicle-mounted temperature controller according to claim 6, wherein the one or more second valves are configured to be controlled such that, in response to the first valve being set to the first state, an amount of circulation of cooling water from the first heat exchanger to the heater core becomes smaller than an amount of circulation of cooling water from the first heat exchanger to the radiator.

8. The vehicle-mounted temperature controller according to claim 1, wherein the first heat circuit is configured so that an inlet of the heat medium flow path of the internal combustion engine is communicated with the core downstream side part.

9. The vehicle-mounted temperature controller according to claim 1, wherein
the temperature controller further comprises a second heat circuit provided with a heat generator heat exchanger configured to exchange heat with a heat generator and configured to circulate a second heat medium through the heat generator, and
the evaporator is part of a second heat exchanger exchanging heat between the second heat medium and the refrigerant and configured to transfer heat from the second heat medium to the refrigerant.

10. The vehicle-mounted temperature controller according to claim 9, wherein the heat generator is a battery.

11. The vehicle-mounted temperature controller according to claim 9, wherein the heat generator is a motor-generator.

12. The vehicle-mounted temperature controller according to claim 9, wherein the heat generator is a power control unit.

* * * * *